US005633306A

United States Patent [19]

Howe et al.

[11] Patent Number: 5,633,306

[45] Date of Patent: May 27, 1997

[54] NONINCENDIVE ROTARY ATOMIZER

[75] Inventors: Varce E. Howe, Zionsville; David R. Huff, Indianapolis; Jerry L. McPherson, Jr., Greenfield; James A. Scharfenberger, Indianapolis, all of Ind.

[73] Assignee: Ransburg Corporation, Indianapolis, Ind.

[21] Appl. No.: 437,218

[22] Filed: May 8, 1995

Related U.S. Application Data

[63] Continuation of Ser. No. 181,654, Jan. 14, 1994, abandoned, which is a continuation-in-part of Ser. No. 985,613, Dec. 3, 1992, Pat. No. 5,433,387.

[51] Int. Cl.[6] .............................. C08J 5/10; C08K 3/10; C08L 61/10

[52] U.S. Cl. .............................. 524/409; 524/430; 252/506; 252/511; 252/518; 239/700

[58] Field of Search .............................. 524/409, 430, 524/352, 356, 361, 366, 379; 239/690, 700; 252/503, 506, 511, 512, 518

[56] References Cited

U.S. PATENT DOCUMENTS

| | | | |
|---|---|---|---|
| 2,728,607 | 12/1955 | Smart . | |
| 2,926,106 | 2/1960 | Gauthier . | |
| 2,989,241 | 6/1961 | Badger . | |
| 3,021,077 | 2/1962 | Gauthier . | |
| 3,048,498 | 8/1962 | Juvinall et al. . | |
| 3,055,592 | 9/1962 | Probst . | |
| 3,826,425 | 7/1974 | Scharfenberger et al. . | |
| 3,900,000 | 8/1975 | Gallen . | |
| 4,148,932 | 4/1979 | Tada et al. . | |
| 4,275,838 | 6/1981 | Fangmeyer . | |
| 4,381,079 | 4/1983 | Allen . | |
| 4,447,008 | 5/1984 | Allen . | |
| 4,485,427 | 11/1984 | Woodruff et al. . | |
| 4,576,827 | 3/1986 | Hastings et al. . | |
| 4,589,597 | 5/1986 | Robisch et al. . | |
| 4,657,835 | 4/1987 | Yashiki | 430/60 |
| 4,745,520 | 5/1988 | Hughey . | |
| 4,772,422 | 9/1988 | Hijikata et al. | 252/511 |
| 4,818,437 | 4/1989 | Wiley | 252/511 |
| 4,887,770 | 12/1989 | Wacker et al. . | |
| 4,896,834 | 1/1990 | Coeling et al. . | |
| 4,919,333 | 4/1990 | Weinstein . | |
| 4,943,005 | 7/1990 | Weinstein . | |
| 5,078,321 | 1/1992 | Davis et al. . | |
| 5,137,215 | 8/1992 | Degli . | |

OTHER PUBLICATIONS

Cekis, G.V. "Polyamide-Imide" in: Modern Plastics Encyclopedia (1981–1982 ed.), p. 42.

M. Kanatzidis, "Conductive Polymers," Chemical and Engineering News, Dec. 3, 1990, pp. 36–54.

*Primary Examiner*—Paul R. Michl
*Assistant Examiner*—U. K. Rajguru
*Attorney, Agent, or Firm*—Barnes & Thornburg

[57] ABSTRACT

A fluent, electrically non-insulative coating composition for an electrically non-conductive rotary atomizer comprises about one-tenth to about one-seventh, by weight, short oil alkyds, about one-fourth to about one-third, by weight, phenolic, and about one-half to about two-thirds, by weight, powdered mixture of oxides of antimony and tin, all in a fluid carrier.

8 Claims, 19 Drawing Sheets

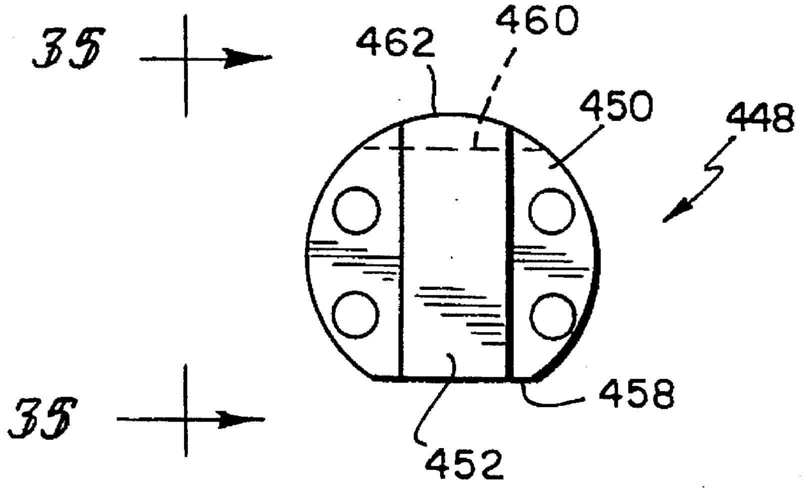
FIG. 33
FIG. 34
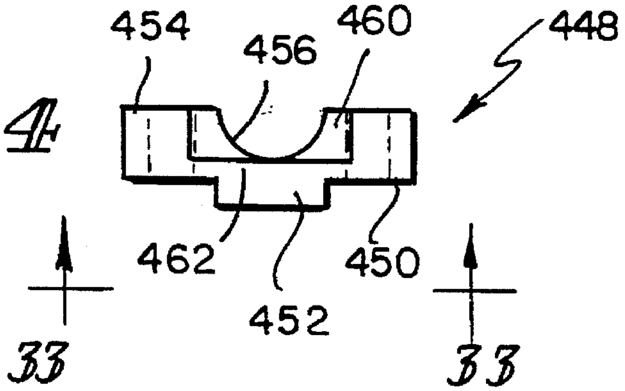
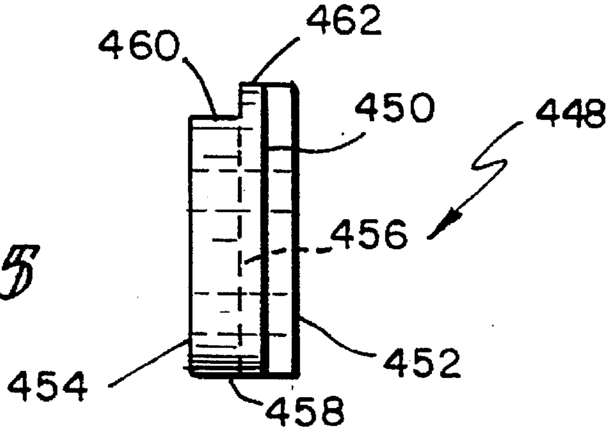
FIG. 35

NONINCENDIVE ROTARY ATOMIZER

CROSS REFERENCE TO RELATED APPLICATIONS

This application is a continuation of U.S. Ser. No. 008/181,654, filed Jan. 14, 1994, now abandoned, which is a continuation-in-part of U.S. Ser. No. 07/985,613, filed Dec. 3, 1992, now U.S. Pat. No. 5,433,387. Both are assigned to the same assignee as this application.

BACKGROUND OF THE INVENTION

1. Field of the Invention

This invention relates to electrostatic coating methods and apparatus.

2. Description of the Related Art

Insurance carriers increasingly require factories in which electrostatically aided coating operations are being conducted to comply with National Fire Protection Association (NFPA) regulations governing finishing processes. NFPA regulations distinguish between agency (usually Factory Mutual-FM) approved, or listed (resin or filled resin construction and resistive electrostatic power supply circuit), coating material dispensers, on the one hand, and unapproved (metal construction and often "stiff" electrostatic power supply circuit) coating material dispensers on the other. Bell-type applicators which utilize resinous materials in their construction and resistive electrostatic power supply circuits are known. See, for example, U.S. Pat. No. 4,887,770. Devices of the general type described in U.S. Pat. No. 4,887,770 achieve whatever safety they achieve at the sacrifice of transfer efficiency and flexibility in the types of coating materials that they can dispense.

SUMMARY OF THE INVENTION

The present invention contemplates providing a superior coating material dispensing system by providing: a stable semiconductive bell; reduced use of metal, and thus, reduced capacitance; and, constant voltage output cascade and control technology. The combination of these features results in an applicator capable of achieving agency approval, capable of superior transfer efficiency, and capable of dispensing a wider variety of coating materials.

"Electrically non-conductive" and "electrically non-insulative" are relative terms. In the context of this application, "electrically non-conductive" means electrically less conductive than "electrically non-insulative." Conversely, in the context of this application, "electrically non-insulative" means electrically more conductive than "electrically non-conductive." In the same way, "electrically non-conductive" means electrically less conductive than "electrically conductive" and "electrically conductive" means electrically more conductive than "electrically non-conductive."

According to a first aspect of the invention, unique methods are provided for producing the proper combination of resistance and capacitance in a bell. These methods are capable of the same high performance as grooved metal bells of the type described in, for example U.S. Pat. No. 4,148,932.

According to a second aspect of the invention, a high voltage circuit is provided which incorporates state-of-the-art cascade power supply technology, and uses relatively low fixed resistance between the electrostatic power supply output and bell. This ensures high operating voltage and performance superior to, for example, U.S. Pat. No. 4,887,770's resinous bell (see FIG. 1), and hand guns of the type described in, for example, U.S. Pat. Nos. 3,021,077, 2,926,106, 2,989,241, 3,055,592 and 3,048,498. The voltage/current "operating window" is based on typical operating characteristics for electrostatic applicators of this type, and competitive metal bell devices. Such devices have been tested and typically found to operate in this voltage/current range. This operating window can be used to predict transfer efficiency.

According to a third aspect of the invention, a bell rotator assembly is provided which is constructed mostly of resinous materials.

According to the first aspect of the invention, a resin or filled resin bell is coated on its outer surface with a semiconductive coating, which may be one or a combination of: thin, for example, less than 200 Å, film metallic coatings applied by vacuum metallization, sputtering or similar processes; a combination of resistive and conductive media such as silicon and stainless steel deposited by vacuum metallization, fluidized bed deposition, spray or any of several like methods; a combination of resistive and conductive materials dispersed in a liquid carrier, such as carbon particles or antimony and tin oxide particles suspended in a varnish, and deposited on the bell surface by dipping, spraying or any of several like application methods; and, irradiation of the bell surface by electron beam or any of several like methods to cause a change in the bell's surface resistance.

Further according to the first aspect of the invention, the high voltage is conducted onto the bell's surface without physical contact to the rotating bell. This non-contact, or commutator, charging can be, for example, a single or multiple wire electrodes which have limited capacitance; a wire ring which surrounds the neck region of the bell remote from the bell's discharge edge; a semiconductive coating on the inner surface of the shaping air ring which surrounds the region of the bell out as far as the front edge of the bell, or other similar means. This non-contact, commutator charging aspect not only efficiently couples the high voltage to the bell outer surface, but it also serves as a buffer to reduce the likelihood that the typically metal bell rotator shaft will be the source of a hazardous spark in the event the resinous bell is not in place, such as when the bell has been removed for cleaning or other maintenance, or for replacement.

Further according to the second aspect of the invention, cascade power supply technology is used in combination with limited fixed resistance, for example, less than 500MΩ, to reduce high voltage degradation among the cascade power supply output, the commutator circuit and the bell edge. Limiting the effective capacitance of the bell rotator motor is achieved by surrounding the motor with resinous materials and permitting the motor potential with respect to ground or some other reference to float, or by coupling the motor to ground or some other reference potential through a bleed resistor. Alternatively, the motor can be coupled to the cascade output, and the electronic circuitry employed in combination with fixed resistance and the semiconductive bell surface treatment to limit the discharge to a safe level. This aspect of the invention also contemplates an improvement in the control of the energy stored in the metal bell rotator motor to a sufficiently low level that the likelihood of hazardous electrical discharge from the motor shaft will be minimized even in the event that the bell cup is not in place when the high-magnitude voltage supply is energized.

The energy W stored in a capacitor can be expressed as $$W=\frac{CV^2}{2} \quad (1)$$

where C=capacitance of the capacitor, and V=voltage across the capacitor. Stored energy in a bell-type coating material atomizer is directly related to the area of the conductive or semiconductive material on the bell surface. Other factors also contribute to the release of energy stored in the bell's capacitance. These include: resistance, which limits the rate of energy discharge; the geometry of the bell and the article to which coating material dispensed from the bell edge is to be applied; any surface charge on the exposed, uncoated resinous material from which the bell is constructed; and, the distribution of the energy being discharged, that is, the number of discharge or corona points. It is noted that current flowing from the bell at steady state conditions has no effect on the amount of energy stored in the bell's capacitance.

In summary, according to the invention the capacitance of the dispensing bell, its rotator and associated components is kept as low as possible, and the bell resistance is kept as low as possible to limit the power dissipation of the bell. The geometries of the coating dispensing bell and associated components are optimized for discharge. The surface charging characteristics of the bell are optimized. Sufficient total system resistance is provided to limit the energy discharge. And, the method of transferring voltage to the bell is optimized. The ideal load curve, FIG. 2, based on these considerations results in a straight horizontal line at the maximum non-incendive voltage throughout the operating current range. Resistance between the cascade-type power supply and bell degrades the performance of power supply safety circuits such as those found in power supplies of the types described in, for example, U.S. Pat. Nos. 4,485,427 and 4,745,520. See FIG. 3. Consequently, a compromise may be required to be made between cost and performance.

BRIEF DESCRIPTION OF THE DRAWINGS

The invention may best be understood by referring to the following description and accompanying drawings which illustrate the invention. In the drawings:

FIG. 18 illustrates a longitudinal sectional view of a detail of the system illustrated in. FIG. 10;

FIG. 33 illustrates an end elevational view of a clamp plate for use with the support of FIGS. 30–32;

FIG. 34 illustrates a top plan view of the clamp plate of FIG. 33; and,

FIG. 35 illustrates a side elevational view of the clamp plate of FIGS. 33–34, taken generally along section lines 35—35 of FIG. 33.

DETAILED DESCRIPTION OF ILLUSTRATIVE EMBODIMENTS

In the following examples, the Rans-Pak 100 power supply available from Ransburg Corporation, 3939 West 56th Street, Indianapolis, Ind. 46254-1597 was used as the high-magnitude potential source. The bell rotator motor and other metal components were provided with a bleed path to ground either through the cascade power supply's 5GΩ bleeder resistor or through another auxiliary resistor connected to ground. The power supply's current overload was adjusted to the least sensitive setting. A resinous bell of the general configuration described in U.S. Pat. No. 4,148,932 and coated with carbon coating of the general type described in U.S. Pat. No. 3,021,077 was used in the examples of FIGS. 1–9. The configurations of FIGS. 1–9 were tested with and without the bell installed. A Ransburg type 18100 high-magnitude potential supply was used as a stiff, more capacitive source to determine to what extent non-incendive characteristics determined during testing were attributable to series resistance rather than to the foldback and safety diagnostics of the Rans-Pak 100 power supply.

EXAMPLE I

Indirect Charging With Commutating Point

Figure 1:
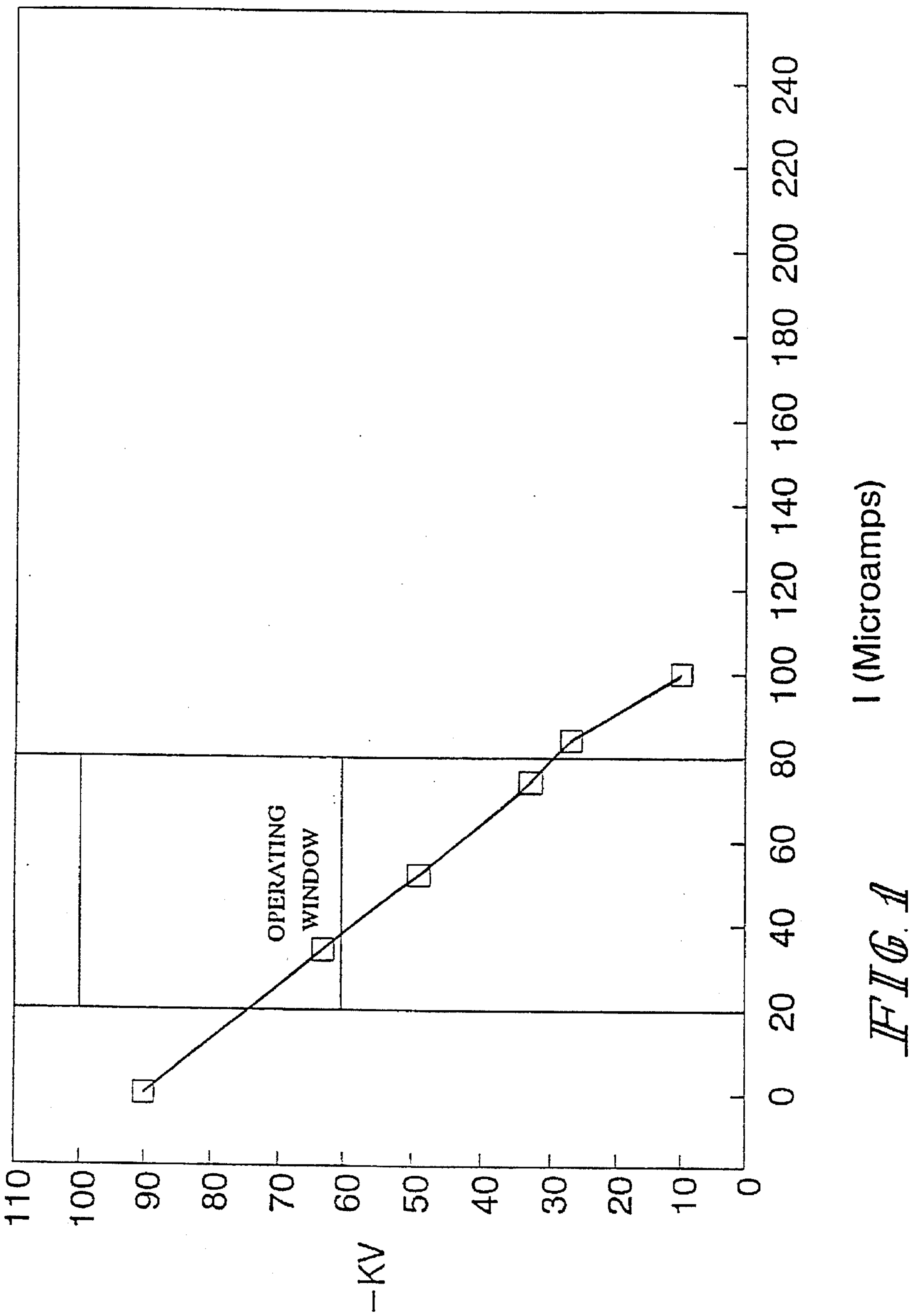
FIG. 1 illustrates an electrostatic potential supply output voltage versus output current characteristic of a prior art rotary atomizer.
Figure 2:
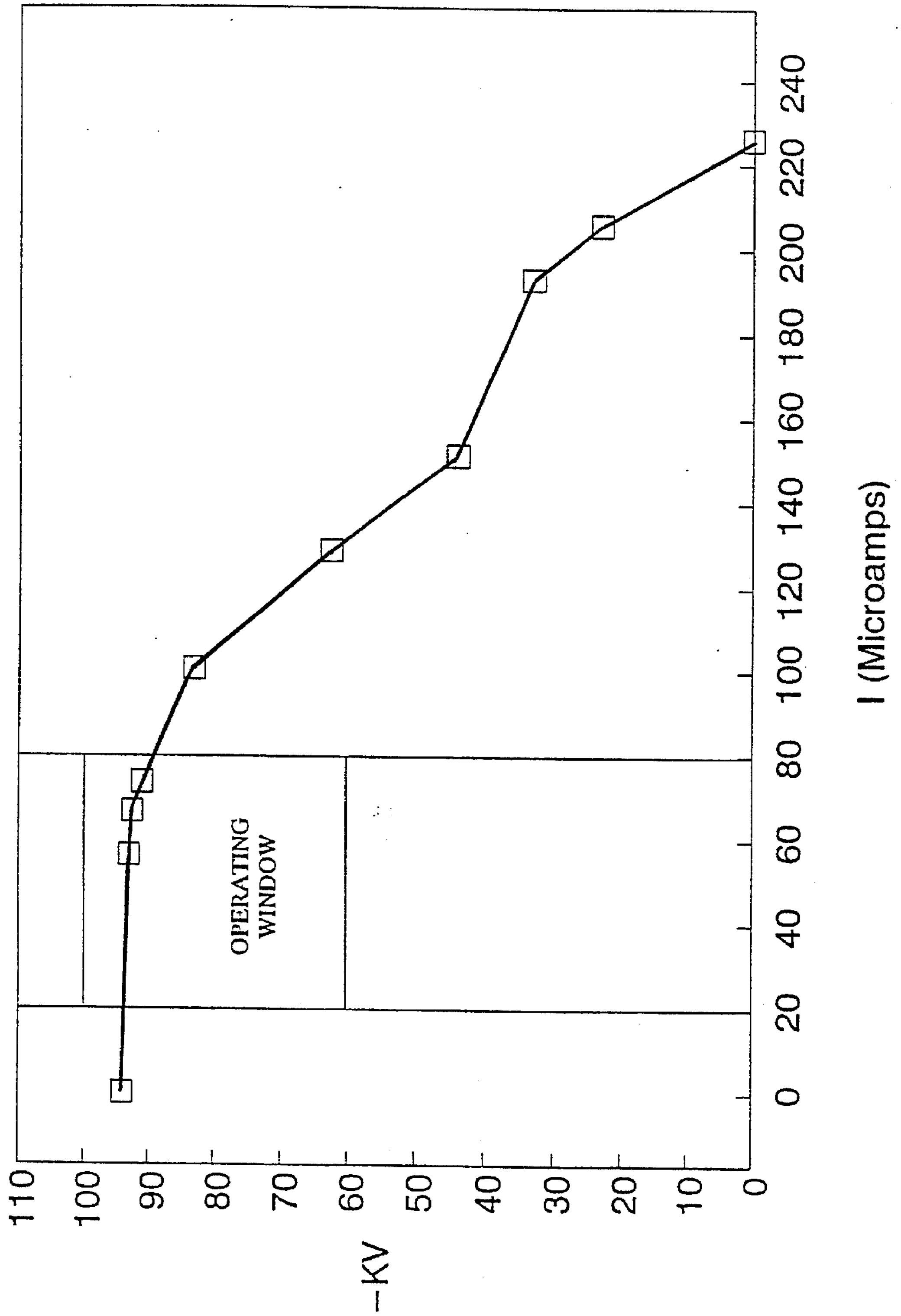
FIG. 2 illustrates an electrostatic potential supply output voltage versus output current characteristic of the rotary atomizer of the present invention.
Figure 3:
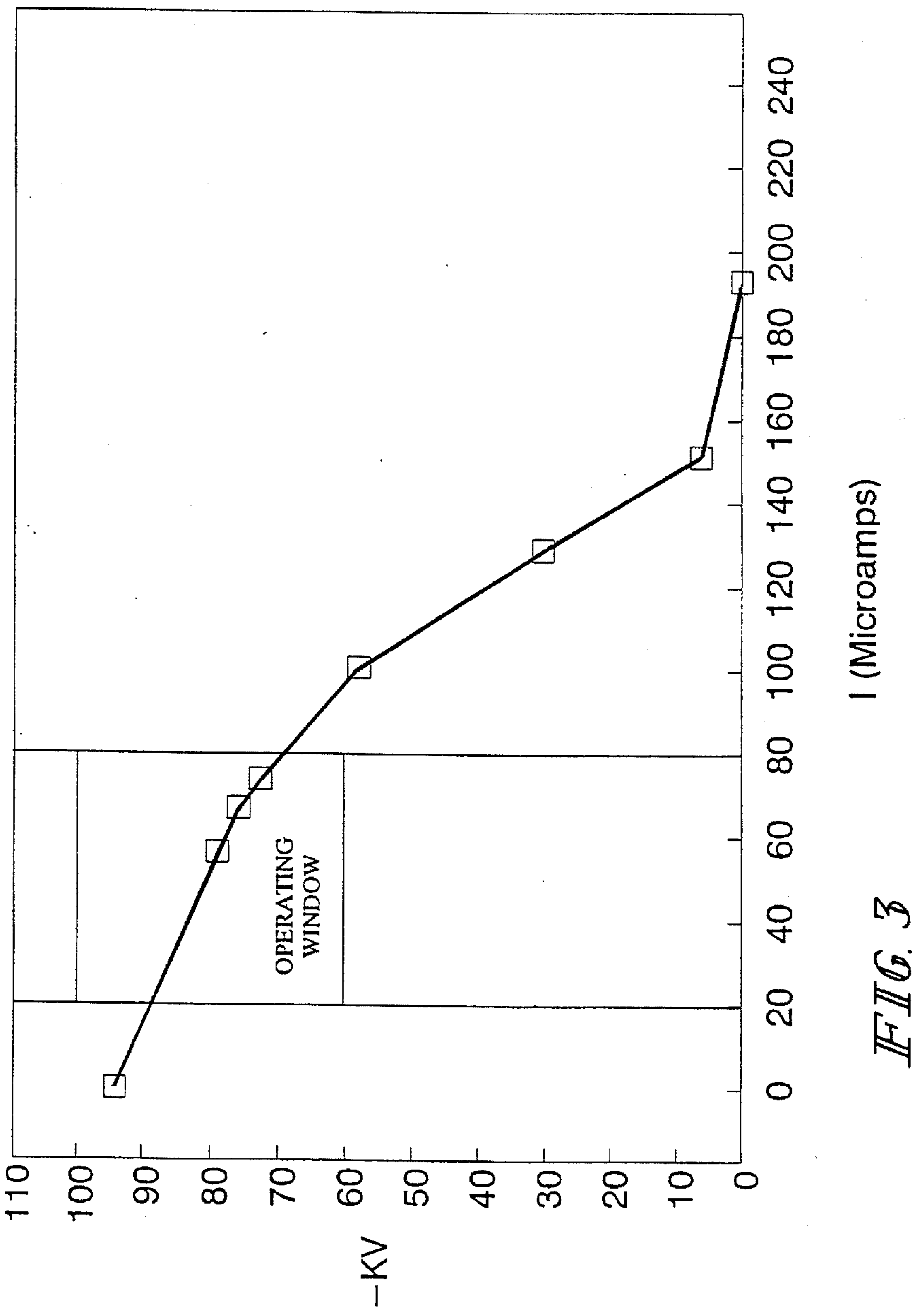
FIG. 3 illustrates an electrostatic potential supply output voltage versus output current characteristic of the rotary atomizer of the present invention.
Figure 4:
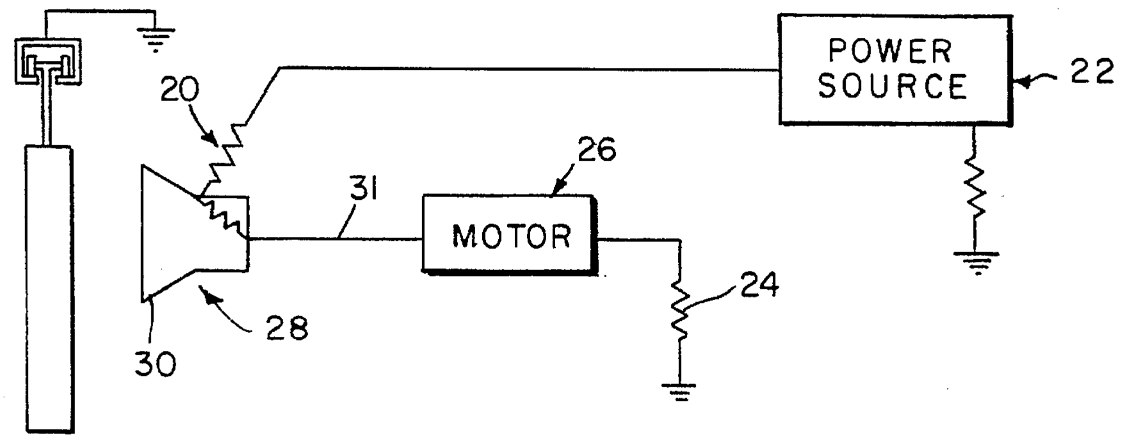
FIG. 4 illustrates a partly block and partly schematic diagram of a system constructed according to the present invention.

The configuration illustrated in FIG. 4 was constructed and tested with the variables noted in Table I.

TABLE I

| POWER SOURCE | $R_{20}$ | $R_{24}$ | DISPLAYED I (μA) | REQUESTED KV | ENERGY DISCHARGE |
|---|---|---|---|---|---|
| Rans-Pak 100 | 250 MΩ | 5 GΩ | 60 | 100 | GOOD |
| Rans-Pak 100 | 150 MΩ | 5 GΩ | 100 | 100 | GOOD |
| Rans-Pak 100 | 20 MΩ | 5 GΩ | 140 | 100 | GOOD |
| Rans-Pak 100 | 250 MΩ | ∞ | 40 | 100 | GOOD |
| 18100 | 250 MΩ | ∞ | — | 100 | GOOD |
| 18100 | 150 MΩ | ∞ | — | 100 | TOO SUSCEPTIBLE TO ARCING |

It was noted that the combination of 250MΩ located directly behind the single point electrode supplied sufficient protection independent of the Rans-Pak system safety diagnostics. Any resistor 20 value below 250MΩ required the Rans-Pak electrostatic power supply 22's slope detection and overcurrent diagnostics to assure non-incendive operation. The 5GΩ motor bleed resistor 24 functioned satisfactorily. A higher resistance of 10GΩ or 20G≠ could also supply sufficient discharge characteristics while limiting the electrostatic power supply 22's current draw. The potential difference existing between the motor 26 and the bell 28 edge 30 through the metal motor shaft 31 was approximately 5KV in the configuration of FIG. 4, which did not present a problem.

EXAMPLE II

Indirect Charging With Commutating Point

Figure 5:
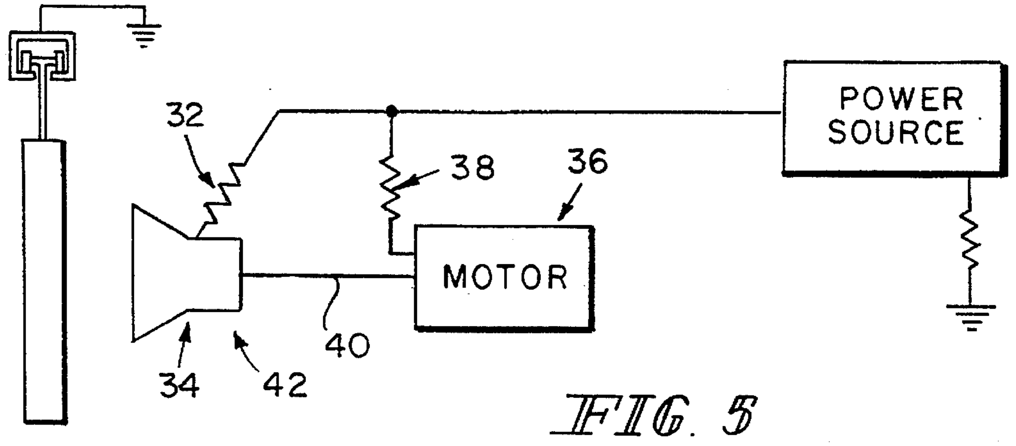
FIG. 5 illustrates a partly block and partly schematic diagram of a system constructed according to the present invention.

The configuration illustrated in FIG. 5 was constructed and tested with the variables noted in Table II.

TABLE II

| POWER SOURCE | $R_{32}$ | $R_{38}$ | REQUESTED KV | ENERGY DISCHARGE (Bell Attached) | COMMENTS |
|---|---|---|---|---|---|
| Rans-Pak 100 | 120 MΩ | 120 MΩ | 100 | GOOD | |
| 18100 | 120 MΩ | 120 MΩ | 100 | ARCING | VERY SUSCEPT-IBLE TO ARCING |
| Rans-Pak 100 | 50 MΩ | 120 MΩ | 100 | NONE | RP100 TRIPS EASILY |
| Rans-Pak 100 | 250 MΩ | 120 MΩ | 100 | NONE | RP100 TRIPS |

TABLE II-continued

| POWER SOURCE | $R_{32}$ | $R_{38}$ | REQUESTED KV | ENERGY DISCHARGE (Bell Attached) | COMMENTS |
|---|---|---|---|---|---|
| | | | | | PREMA-TURELY |
| Rans-Pak 100 | 250 MΩ | 3 MΩ | 100 | GOOD | |
| Rans-Pak 100 | 250 mΩ | 0Ω | 100 | GOOD | |

It was noted that the resistor 32 located directly behind the bell 34 determines the system characteristics and that the motor 36 resistance is not as critical and can even be 0Ω. The length of the resinous motor shaft 40 was sufficient to prevent arcing caused by the voltage drop of resistor 32 to the rear 42 of the bell 34.

EXAMPLE III

Direct Charging With Commutating Point

Figure 6:
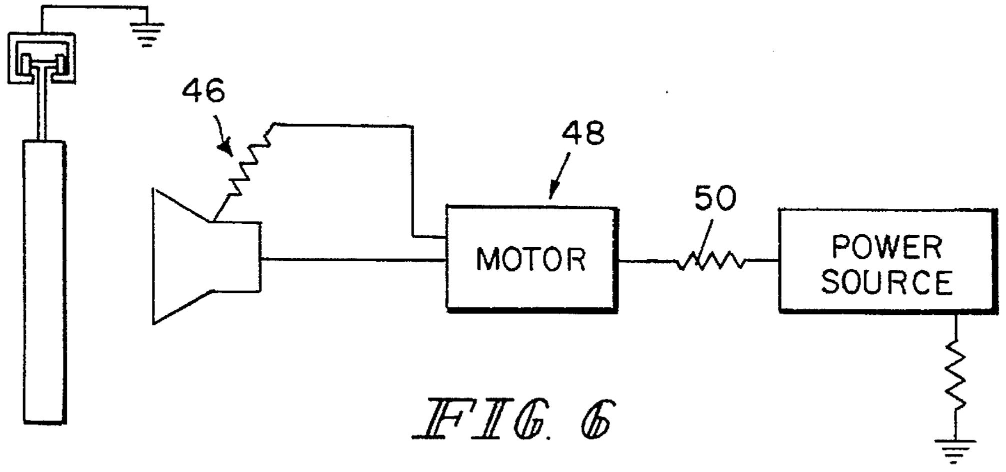
FIG. 6 illustrates a partly block and partly schematic diagram of a system constructed according to the present invention.

The configuration illustrated in FIG. 6 was constructed and tested with the variables noted in Table III.

surrounds the motor shaft, but the U.S. Pat. No. 3,826,425 system includes an electrically non-conductive, for example, resin or filled resin, shaft, and the commutator transfers the voltage to the rotating disk.

The regulated power source 22, such as the Rans-Pak 100 power supply; limited amount of fixed resistance, for example, less than about 500MΩ; thin film commutator and a resistive feed tube tip together reduce the likelihood of an incendive arc from the shaft or housing in the event the bell is not in place when the high voltage is energized.

Figure 7:
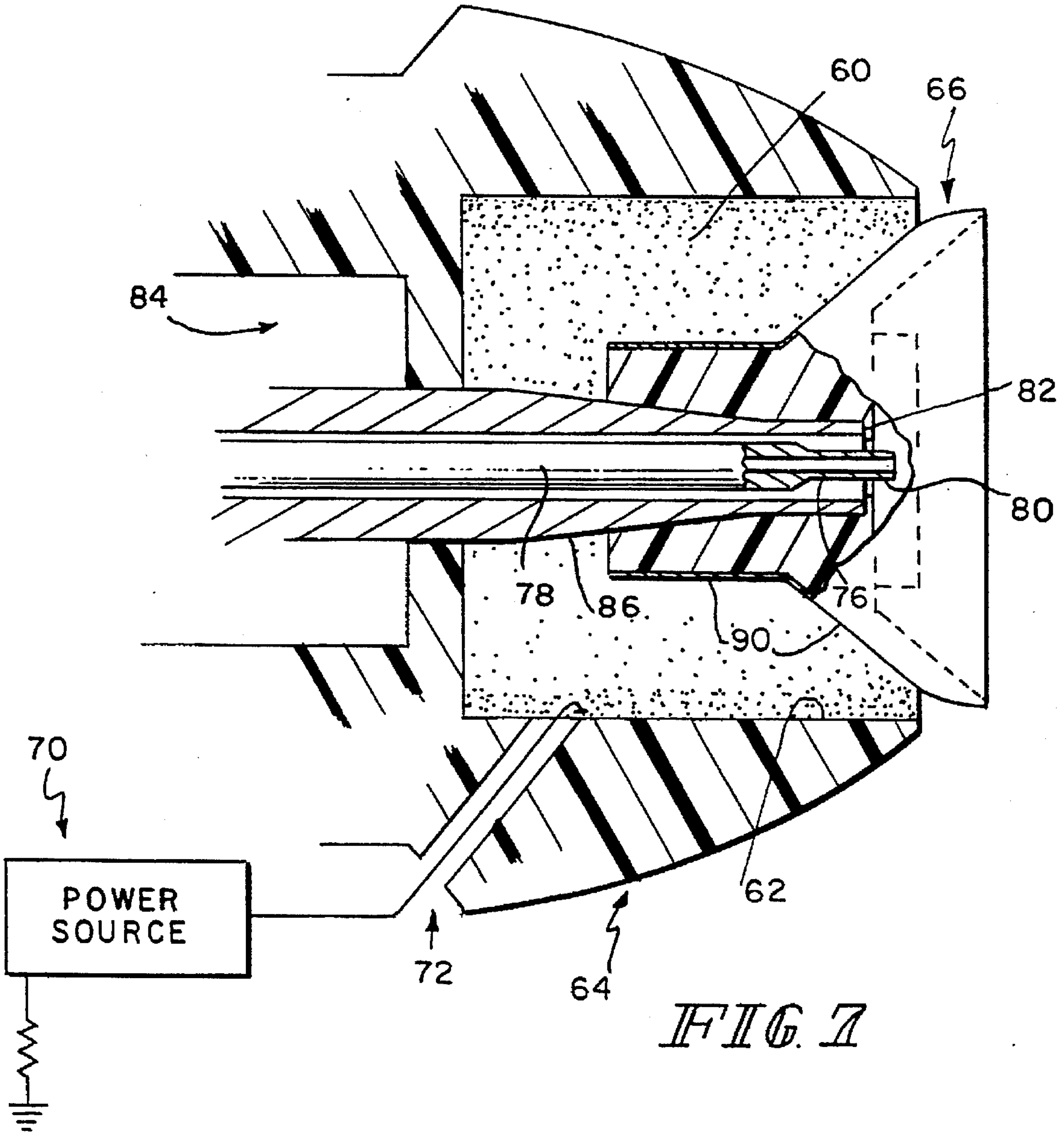
FIG. 7 illustrates a fragmentary axial sectional view of a system constructed according to the present invention.
Figure 8B:
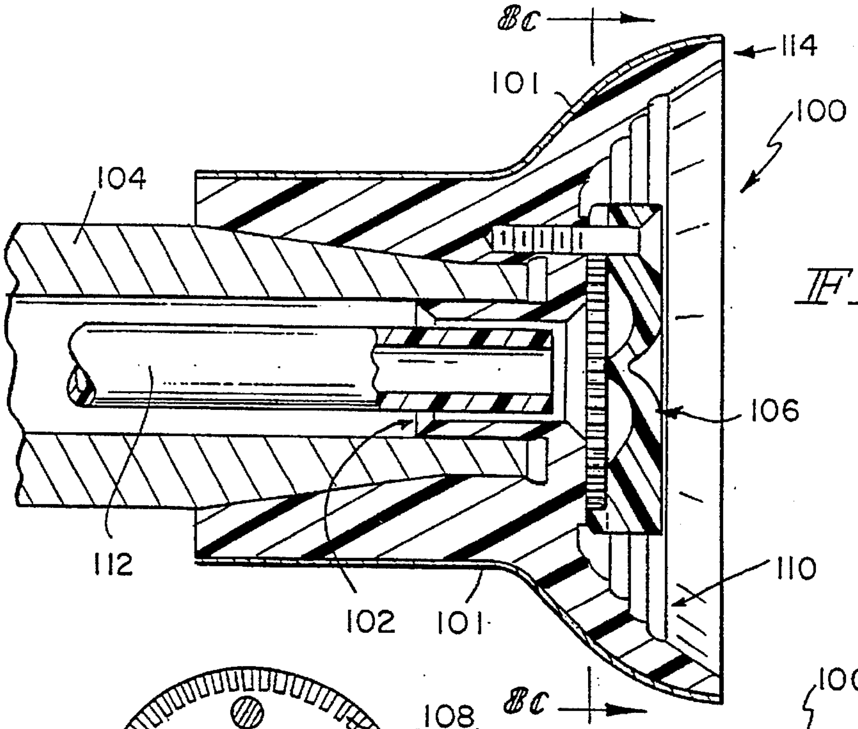
FIG. 8*a–d* illustrate several views of a detail of the system illustrated in FIG. 7.
Figure 8C:
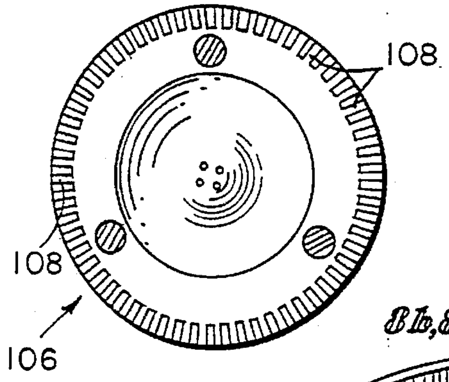
Figure 8D:
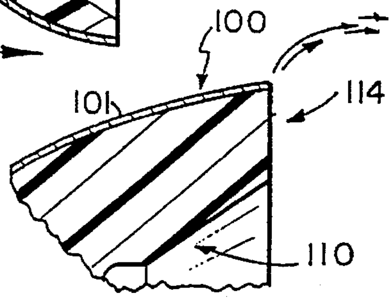
Figure 8A:
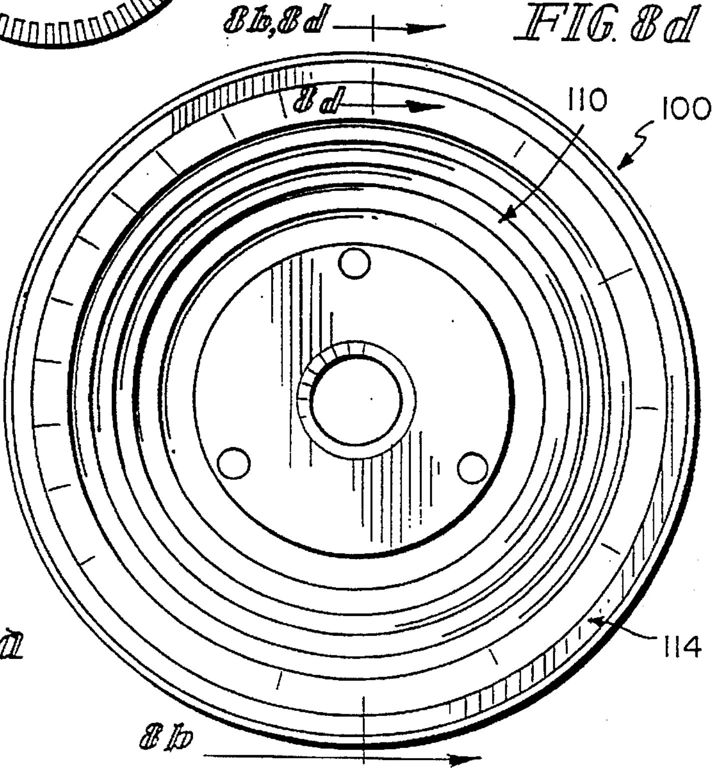

Referring to FIG. 7, a thin film, high voltage commutator 60 comprises a semiconductive film which coats the inner, typically right circular cylindrical surface 62 of the typically

TABLE III

| POWER SOURCE | $R_{50}$ | $R_{46}$ | DISPLAYED I (μA) | REQUESTED KV | ENERGY DISCHARGE (Bell Attached) | COMMENTS |
|---|---|---|---|---|---|---|
| Rans-Pak 100 | 250 MΩ | 10 MΩ | 60 | 100 | GOOD | |
| Rans-Pak 100 | 120 MΩ | 10 MΩ | — | 100 | GOOD | RP100 TRIPS EASILY |
| Rans-Pak 100 | 0Ω | 10 MΩ | 70 | 100 | NONE | RP100 TRIPS PREMA-TURELY |
| Rans-Pak 100 | 0Ω | 50 MΩ | — | 100 | NONE | RP100 TRIPS PREMA-TURELY |
| Rans-Pak 100 | 0Ω | 50 MΩ | — | 70 | GOOD | RP100 TRIPS EASILY |
| 18100 | 0Ω | 50 MΩ | — | 40 | ARCING | VERY SUSCEPT-IBLE TO ARCING |
| 18100 | 250 MΩ | 50 MΩ | 105 | 100 | GOOD | |

It was noted that the electrode resistor 46 can be kept relatively small, for example, 10MΩ–50MΩ, in conjunction with a larger motor 48 resistance 50.

The prior art such as, for example, U.S. Pat. No. 4,887,770, does not efficiently and effectively address the problems of transferring the high voltage to the outside surface of the resinous bell without contacting the bell surface, and of controlling the stored energy in the metal bell rotator so that the likelihood of a hazardous electrical discharge from the motor shaft will be minimized even if the bell is not in place when the high voltage is on. Instead, prior art of this type employs very high fixed resistance, on the order of 1GΩ or more, to achieve safety. Other rotary atomizers, of the type described in, for example, U.S. Pat. Nos. 3,021,077, 2,926,106, 2,989,241 and 3,048,498, use direct contact to transfer the voltage to the bell surface.

U.S. Pat. No. 3,826,425 relates to a rotating resistive disk. This reference describes a non-contact commutator which resinous shaping air housing 64 which surrounds the rotating bell 66. Coating 60 is coupled to the high voltage circuit 70 through a conductor 72 of limited capacitance. The commutating film 60 is constructed according to any of a variety of methods, such as by applying a semiconductive coating comprising a mixture of carbon and varnish of the type described in U.S. Pat. No. 3,021,077 to the inner surface 62 and then curing the applied coating 60 by heat or chemical reaction. Another suitable method would be to provide the shaping air housing with a cylindrical insert comprising a semiconductive resin or filled resin material.

Further according to this aspect of the invention, the tip 76 of the resinous feed tube 78 for the coating material is coated 80 with a semiconductive material. The coating 80 extends beyond the tip 82 of the metal motor 84 shaft 86. Energy is stored in the shaft 86 and motor 84 by virtue of their proximity to the high voltage on commutator film 60, and the practical limitation that motor 84 and shaft 86 cannot be at ground. The motor shaft 86 charges the tip 76 of the resinous feed tube 78. Since the tip 76 of the feed tube 78 is protruding and is semiconductive, with limited stored energy, it dissipates the energy from the motor 84 and shaft 86 when approached by a grounded object.

Tests conducted on the device illustrated in FIG. 7 establish that it provides efficient transfer of the high voltage from the thin film commutator 60 to the outer surface 90 of the resinous bell 66. This results in high transfer efficiency and safe operation. This configuration passes the standard FM test for non-incendive listed electrostatic equipment. These tests also establish that the device illustrated in FIG. 7 is capable of achieving effective control of the discharge energy from the metal motor 84 and shaft 86. According to standard test procedures used by FM and other safety testing agencies, a motor assembly incorporating a resinous bell having the general configuration illustrated in U.S. Pat. No. 4,148,932, for example, would not be tested without the resinous bell in place. However, it is believed to be highly desirable, in order to offer the greatest protection to users of this equipment, to safety test the assembly with the bell 66 removed, exposing the tip 82 of the metal shaft 86. When so tested, the assembly illustrated in FIG. 7 passes the standard safety test.

FIGS. **8*a–d* illustrate a partly sectional front elevational view, a sectional side elevational view, a sectional view of a detail, and a greatly enlarged and fragmentary sectional side elevational view, respectively, of a resinous bell constructed according to the present invention. Bell 100 can be constructed from any suitable resin or filled resin such as, for example, Victrex 450GL30, 30% glass-filled polyetheretherketone (PEEK) available from ICI Americas, P.O. Box 6, Wilmington, Del. 19897, Ultem® filled or unfilled polyetherimide (PEI) available from General Electric, One Plastics Avenue, Pittsfield, Mass. 01201, Valox #5433 33% glass filled polybutylene terephthalate (PBT) available from GE, or filled or unfilled Torlon polyamide-imide (PAI) available from Amoco, 38C Grove Street, Ridgefield, Conn. 06877. The outside surface of bell 100 is coated with a semiconductive coating 101** of any of the types previously described.

A labyrinth-type region 102 of bell 100 extends into the inner portion of the metal bell rotator motor shaft 104. This labyrinth 102 creates a longer path for high voltage to travel from the metal shaft 104 to the bell splash plate 106. The bell splash plate 106 has several small grooves 108 which provide passages to the face 110 of the bell 100. Coating material flows through grooves 108 on its way from the feed tube 112 to the discharge zone 114. In other words, bell 100 is designed to prevent hazardous discharges from the metal shaft 104, through the small grooves 108 in the splash plate 106 to ground. It may be recalled that FIG. 7 illustrates a method of reducing the likelihood of hazardous electrical discharges by coating the end 76 of the resinous feed tube 78 with a semiconductive, for example, carbon-base, coating. Although the bell 100 illustrated in FIGS. **8*a–d* overcomes the need for coating the end of the feed tube 112 with semiconductive material to reduce the likelihood of such hazardous discharges through the splash plate grooves 108, the semiconductively-coated feed tube 78 of FIG. 7 can be employed with the bell 100 of FIGS. 8*a–d* to reduce the likelihood of hazardous discharges from the motor shaft 104 when the electrostatic power supply is turned on while the bell 100 of FIGS. 8*a–d* is removed from the shaft 104**.

EXAMPLE IV

Indirect Charging With Commutating Shaping Air Ring Coating

Figure 9:
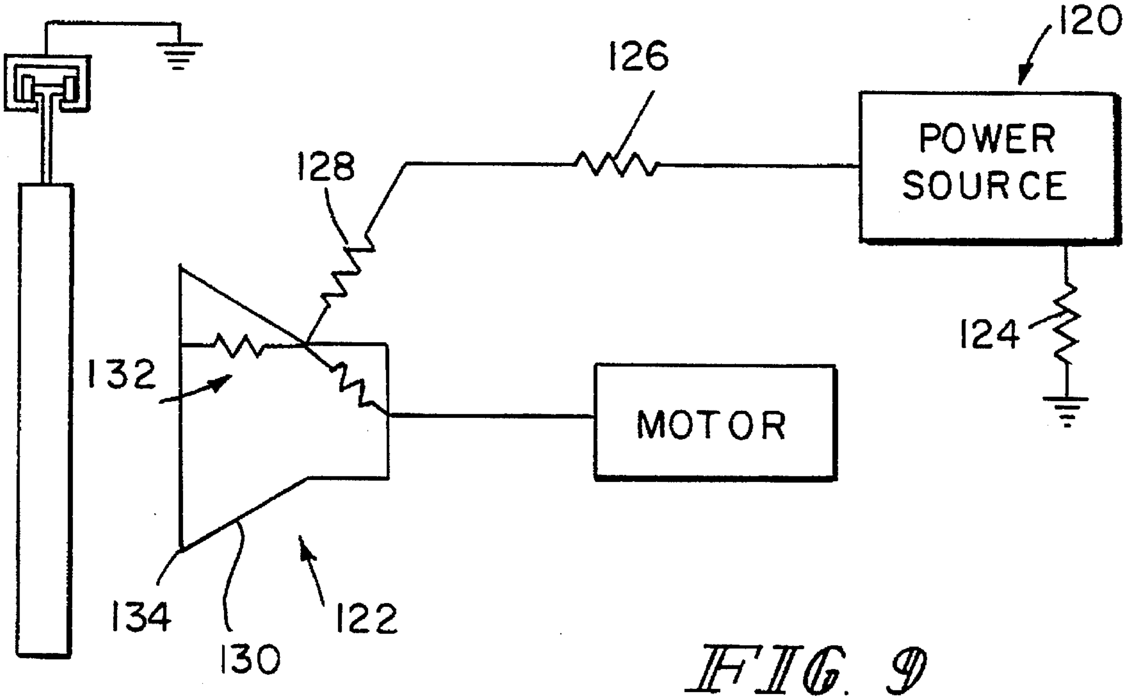
FIG. 9 illustrates a partly block and partly schematic diagram of a system constructed according to the present invention.

The configuration illustrated in FIG. 9 with the charging technique illustrated in FIG. 7 was tested with the variables noted in Table IV. A DeVilbiss Ransburg type EPS554 electrostatic power supply 120 was used in Example IV. Supply 120 is available from DeVilbiss Ransburg Industrial Liquid Systems, 320 Phillips Avenue, Toledo, Ohio 43612. The resistance 124 between the power supply 120 and ground was 5GΩ. The resistance 126 between the power source 120 and the semiconductive commutating coating on the inside of the shaping air cap (see FIG. 7), the effective resistance 128 between the commutating coating and the surface 130 of the bell 122, and the effective resistance 132 to the discharge zone 134 of the bell 122 were all varied as noted in Table IV.

TABLE IV

| $R_{132}$ | $R_{128}$ | $R_{126}$ | Labyrinth 102 of FIGS. 8a–d | Splash Plate 106 of FIGS. 8a–d | End of Feed Tube Coated With Semiconductive Coating | Ignition Test Results | COMMENTS |
|---|---|---|---|---|---|---|---|
| 23 MΩ | 20 MΩ | 250 MΩ | Yes | Yes | Yes | Passed | Carbon tracking on inner edge of bell |
| 23 MΩ | 20 MΩ | 200 MΩ | Yes | Yes | Yes | Passed | Carbon tracking on inner edge of bell |
| 23 MΩ | 20 MΩ | 150 MΩ | Yes | Yes | Yes | Failed | |
| 23 MΩ | 20 MΩ | 150 MΩ | Yes | Yes | Yes | Failed | |
| 23 MΩ | 20 MΩ | 200 MΩ | Yes | Yes | Yes | Passed | Carbon tracking |
| 23 MΩ | 20 MΩ | 200 MΩ | Yes | Yes | Yes | Passed | Carbon tracking |
| 23 MΩ | 20 MΩ | 250 MΩ | Yes | Yes | No | Passed | No visible corona or discharges through splash plate |
| 23 MΩ | 20 MΩ | 250 MΩ | Yes | No | No | Passed | No visible corona or discharges to shaft |

TABLE IV-continued

| $R_{132}$ | $R_{128}$ | $R_{126}$ | Labyrinth 102 of FIGS. 8a–d | Splash Plate 106 of FIGS. 8a–d | End of Feed Tube Coated With Semiconductive Coating | Ignition Test Results | COMMENTS |
|---|---|---|---|---|---|---|---|
| ∞ | 20 MΩ | 250 MΩ | Yes | No | No | Failed at 2 min. | No carbon tracking |
| ∞ | 20 MΩ | 250 MΩ | Yes | Yes | No | Passed | |
| 11 MΩ | 20 MΩ | 250 MΩ | Yes | Yes | No | Passed | Carbon tracking on inner edge of bell |
| 5 MΩ | 20 MΩ | 250 MΩ | No | Yes | No | Failed at 70 sec. | Ignition while probing splash plate 106 |
| 11 MΩ | 2 MΩ | 250 MΩ | Yes | Yes | No | Failed at 10 sec. | Ignition while probing rear of shaping air cap |
| 5 MΩ | 20 MΩ | 250 MΩ | No | Yes | Yes | Failed at 35 sec. | Ignition while probing splash plate 106 |
| 30 MΩ | 20 MΩ | 250 MΩ | No | Yes | Yes | Failed at 40 sec. | Ignition while probing splash plate 106 |

The minimum series resistance 124 in these tests which passed the ignition test was between 150MΩ and 200MΩ with a bell 122 and shaping air commutator. A 250MΩ resistor 124 was used for the remaining tests.

The labyrinth 102 type bell of FIGS. 8*a–d* provided protection against ignition to the metal motor shaft in every test with the exception of an uncoated bell 122 with no splash plate 106. No non-labyrinth bell 122 passed the ignition test. The outer end of the paint feed tube does not need to be coated when using a labyrinth-type bell.

Ignition occurred from the rear of the commutating coating on the inside of the shaping air ring. This indicates that the minimum resistance is between 2MΩ and 20MΩ. The resistance may be critical due to the large coated surface area and surface geometry.

Although carbon tracking occurred in the discharge zones of bells while probing within approximately 0.2 inch (about 5.1 mm) of surfaces, such tracking did not result in ignition.

Shielded high voltage cables did not increase stored system energy sufficiently to promote ignition while using 200MΩ series resistance 124.

A variety of methods were pursued for imparting conductivity to the bell. To function effectively, a material must be capable of distributing charge uniformly throughout the discharge zone, and exhibit low enough capacitance to pass safety specifications. The materials tested include carbon fiber-filled polymers, intrinsically conductive polymers, and $TiO_x$ deposition.

A conductive carbon fiber loaded, polyester (polybutylene terephthalate—PBT) resin from LNP, 412 King Street, Malvan, Pa. 19355, was molded into bells and tested for ignition. This material failed because it did not pass FM testing, and because of the inconsistency in charge distribution at the bell edge from bell to bell. This inconsistency is due to the fact that the conductivity in the region of interest ($10^5$–$10^7$ ohm cm), is very dependent on the amount of carbon fiber present. A few percent variation in the amount of carbon fiber in the formulation changes the resistance value dramatically. The length of the carbon fibers also has a considerable effect on conductivity.

Intrinsically conductive polymers, such as polyaniline, were pursued since they provide conductivity on the molecular level (M. Kanatzidis, "Conductive Polymers," Chemical and Engineering News, Dec. 3, 1990). This attribute offers more consistent resistivity values than carbon fiber-filled systems. Injection molding trials were run on three resins supplied by Americhem Inc., 225 Broadway East, Cuyahoga Falls, Ohio 44221. These resins had resistivities of $10^3$, $10^5$, and $10^9$ ohm cm. Tests were run on bells made from these resins, and on non-conductive resin bells with thin layers of these resins molded onto their outside surfaces. This latter approach was deemed necessary in order to give the bells the structural strength required to withstand rotational stresses. These resins are sensitive to temperatures used in injection molding. Several molding trials were performed using the lowest melt temperature possible, and the bells exhibited losses in conductivity as a result of this sensitivity to process temperature. A liquid polyaniline-based coating was also applied to bells, but this coating was very irregular, and so was its resistivity.

Another intrinsically conductive proprietary polymer based on polypyrrole was obtained from Milliken Chemical Co., P.O. Box 1927, M-405, Spartanburg, S.C. 29304-1927. This polymer was applied to Allied Signal Capron, PTL Building, P.O. Box 2332R, Morristown, N.J. 07960, 8260 nylon bells. The process used is typically performed on continuous fibers to make them conductive, but Milliken's attempt to coat bells was successful. The best bell, which passed ignition tests, had a resistivity value of $2\times10^5$ ohm cm. Additionally, these bells were subjected to 100% humidity conditions for several days and then retested for ignition. The fact that they also passed indicates that moisturization of the nylon, even from saturation, does not contribute to ignition failures. This process is therefore considered a suitable alternative to the previously described carbon coating.

Figure 10:
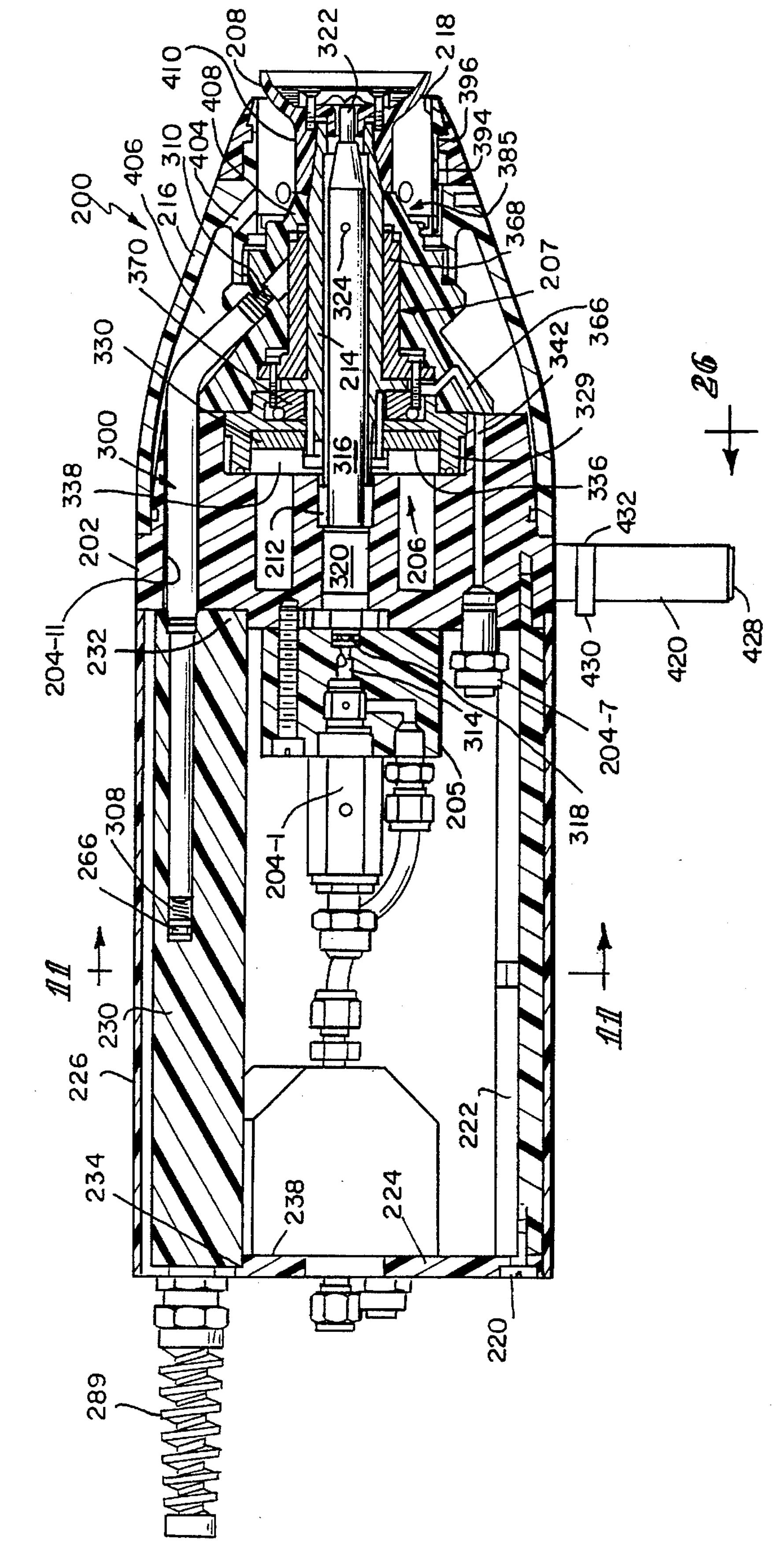
FIG. 10 illustrates a partly sectional side elevational view;of a system constructed according to the present invention.
Figure 11:
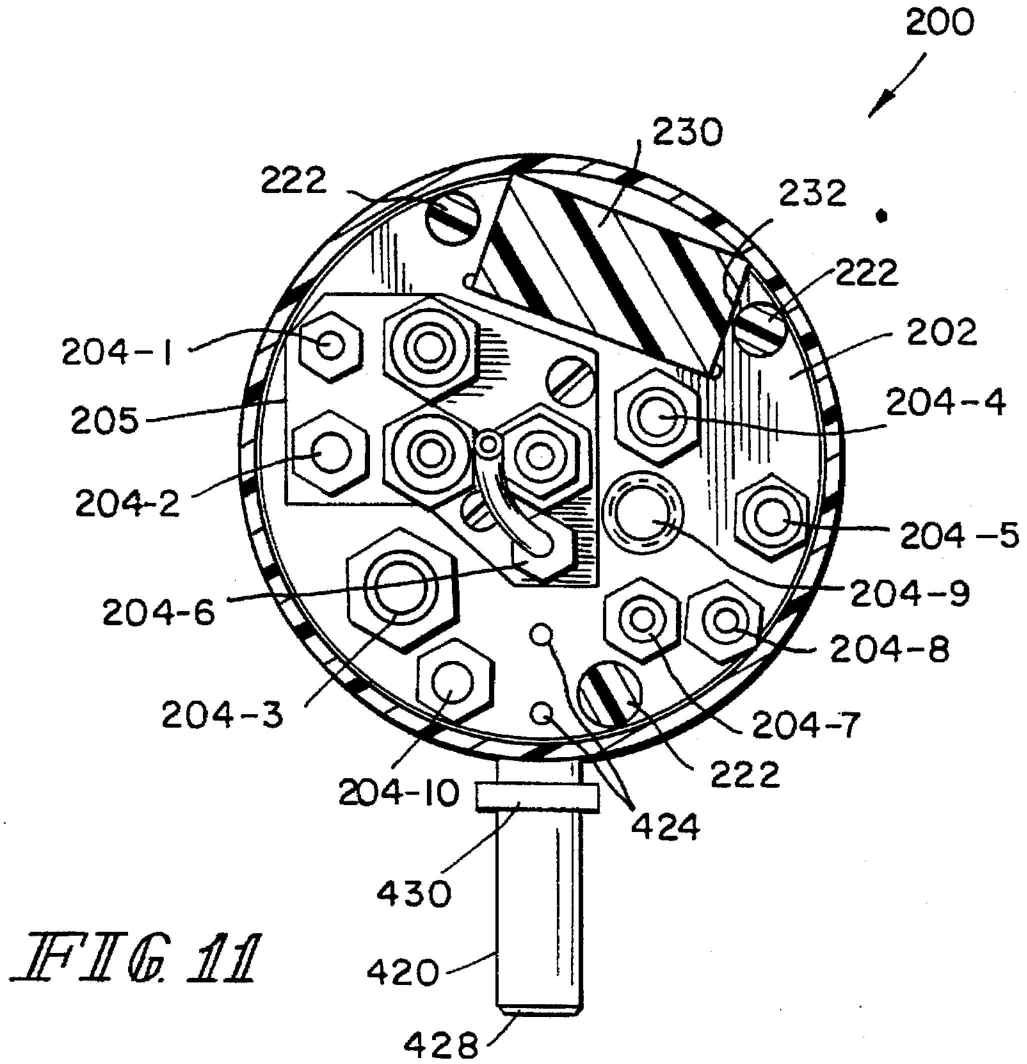
FIG. 11 illustrates a transverse sectional view of the system of FIG. 10, taken generally along section lines 11—11 of FIG. 10.
Figure 12:
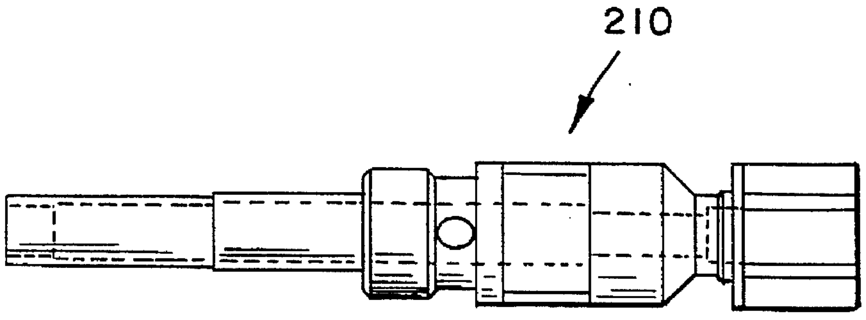
FIG. 12 illustrates a side elevational view of a detail of the system illustrated in FIG. 10.

In another embodiment of the invention best illustrated in FIGS. 10–35, an atomizer assembly 200 includes a manifold 202 constructed from, for example, Delrin® acetal resin. Referring to FIG. 11, connections 204 are made through manifold 202 to coating material (input 204-1, output 204-2), turbine drive air (204-3), turbine braking air (204-4), atomized coating material envelope, or shaping, air (204-5), and a solvent for the coating material (204-6). The coating material input and output fittings and solvent fitting (204-1, -2 and -6) are provided on separate valves on a trigger/dump/solvent manifold subassembly 205 mounted on manifold 202 by suitable threaded, electrically non-conductive fasteners.

Since the turbine 206 which spins the atomizer 208 in this embodiment is an air bearing turbine, bearing air inlet and outlet fittings 204-7, 204-8, respectively, are provided on the manifold 202. Bearing air is provided through the inlet 204-7, to the bearing 207 and the outlet 204-8. Bearing 207 illustratively is of a type available from Westwind Air Bearings, Inc., 745 Phoenix Drive, Ann Arbor, Mich., 48108. In the event flow to the inlet 204-7 is interrupted, this interruption is sensed by a pressure switch (not shown) coupled to the outlet 204-8 and the coating material, solvent, and turbine drive air flows to the turbine 206 are interrupted to try to spare the turbine.

A connection 204-9 accommodates a fiber optic speed transducer 210 (FIG. 12) such as the DeVilbiss Ransburg type SMC-428 inductive-to-fiber optic transmitter. A weep port 204-10 is coupled through passageways in the manifold 202 to a gallery 212 provided at the back end of the turbine shaft 214. Because coating material backs up in the interior of the turbine shaft 214 when the atomizer 208 is not being spun by the turbine 206, and because backup of coating material in the turbine 206 can occur in this event, the weep port 204-10 drains the gallery 212 when the assembly 200 is mounted as illustrated in FIGS. 10-11. This reduces the time-consuming disassembly, cleaning and reassembly of assembly 200 which might otherwise occur if coating material is permitted to flow with the turbine 206 not rotating. A passageway 204-11 is provided for a purpose which will be explained.

The assembly 200 includes a front housing 216 which is somewhat projectile-shaped in configuration, but with a recessed distal end 218. Front housing 216 illustratively is constructed from Delrin® acetal resin. Threaded fasteners 220 formed from electrically non-conductive materials, such as Delrin® resin, nylon and the like, and three threaded rear plate support rods 222 constructed from, for example, Delrin® acetal resin, couple a rear plate 224 constructed from, for example, Delrin® acetal resin, to the manifold 202, and retain a generally right circular cylindrical rear shroud 226 on manifold 202. Rear shroud 226 illustratively is constructed from high density polyethylene. A resistor housing 230 is captured in recesses 232, 234, respectively, provided in the back surface 236 of manifold 202 and the front (inside) surface 238 of rear plate 224.

Figure 13:
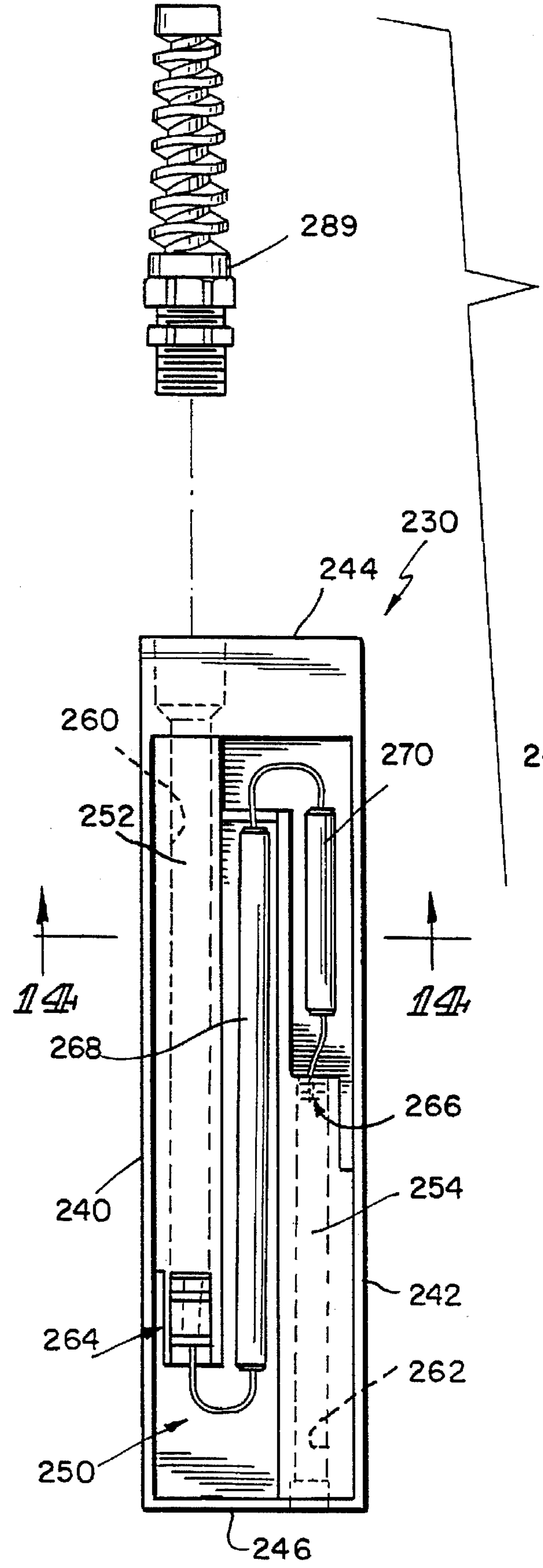
FIG. 13 illustrates a partly exploded top plan view of a detail of the system of FIG. 10.
Figure 14:
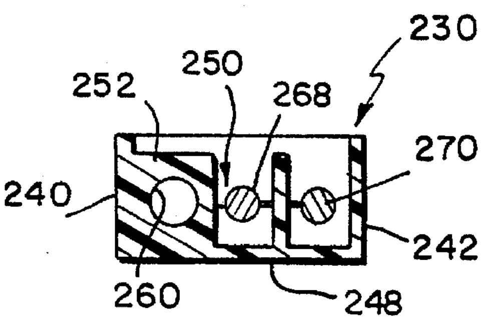
FIG. 14 illustrates a transverse sectional view of the detail of FIG. 13, taken generally along section lines 14—14 of FIG. 13.

Referring to FIGS. 13–14, housing 230 is configured generally as a right rectangular prism having side walls 240, 242 extending along the long dimension thereof (lengthwise of assembly 200) end walls 244, 246 extending along the short dimension thereof (transversely of assembly 200) and a bottom wall 248 joining one edge of each of walls 240, 242, 244, 246 and defining a resistor housing 230 interior 250.

Each of side walls 240, 242 includes a thickened region 252, 254, respectively. The thicker region 252 of sidewall 240 terminates intermediate end walls 244, 246 to define a portion of interior 250 therebetween. The thicker region 254 of sidewall 242 terminates intermediate end walls 244, 246 to define a portion of interior 250 therebetween. The thicker region 252 of sidewall 240 defines a circular cross-section passageway 260 extending between end wall 244 and interior 250. The thicker region 254 of sidewall 242 defines a circular cross-section passageway 262 extending between end wall 246 and interior 250. Each of passageways 260, 262 is designed to accommodate a high potential electrical connector 264, 266, respectively. Resistor housing 230 illustratively is constructed from glass filled Delrin® acetal resin. One lead of a high voltage resistor 268, such as a 450MΩ resistor, is soldered to connector 264. The other lead of resistor 268 is soldered to a lead of a high voltage resistor 270, such as a 200MΩ resistor. The remaining lead of resistor 270 is coupled to connector 266. Electrically non-conductive potting compound is then poured into interior 250 to fill all the voids in interior 250 and is permitted to harden to fix the positions of resistors 268, 270 in interior 250.

Figure 15:
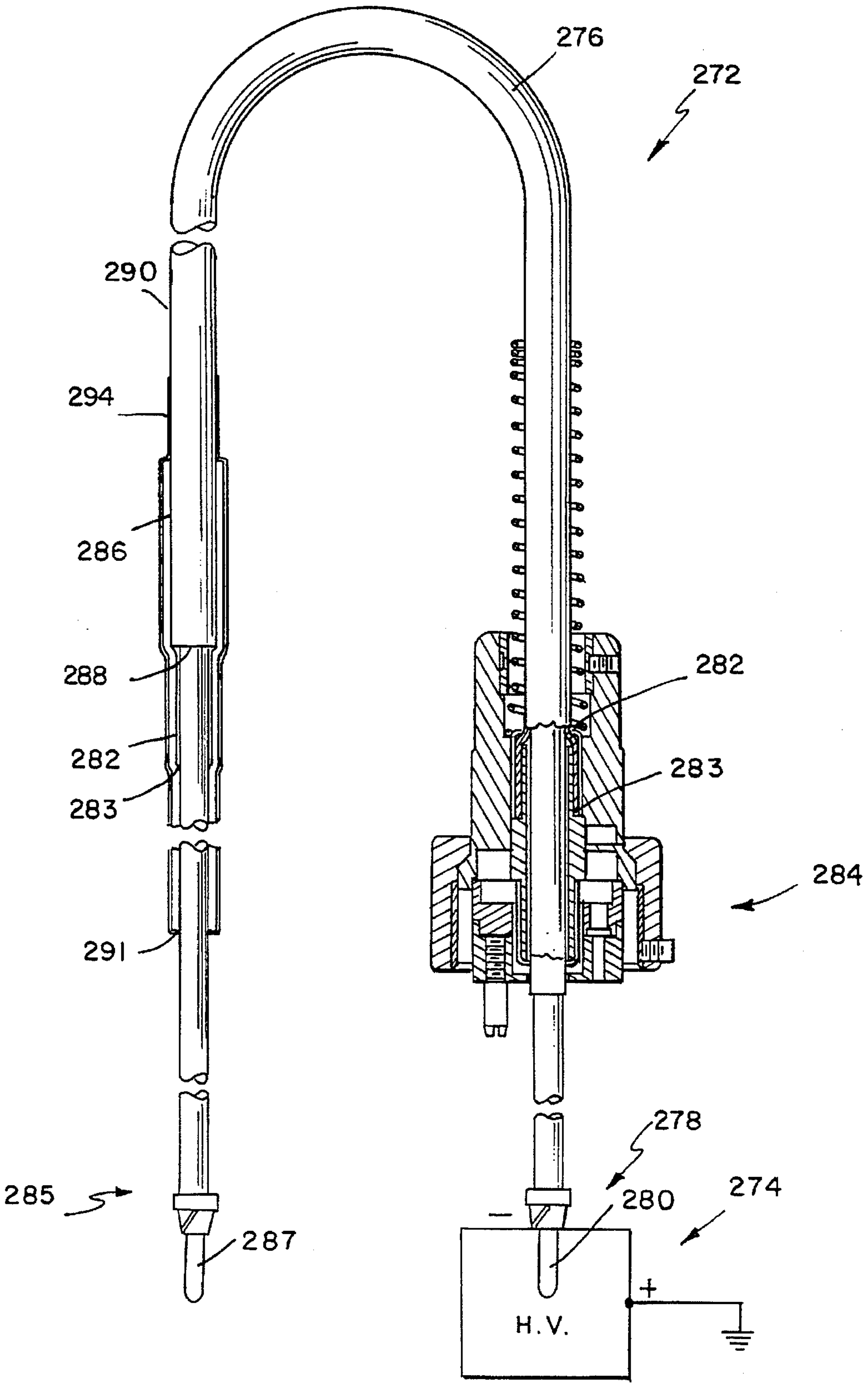
FIG. 15 illustrates a partly sectional plan view of a detail of the system illustrated in FIG. 10.

Referring to FIG. 15, a connection is made from connector 264 through a high voltage cable assembly 272 to one output terminal, typically the negative terminal, of a power supply 274, such as a DeVilbiss Ransburg type EPS554 power supply. The remaining output terminal of power supply 274 is coupled to ground. Cable assembly 272 includes a length 276 of high voltage cable, such as high-flex 100KV shielded coaxial cable. The center conductor of cable 276 is finished at the power supply end 278 with a banana plug 280. The shield 282 of cable 276 is terminated at 283. A threaded connector 284 adjacent end 278 threadedly couples end 278 to power supply 274 when the electrical connection is made thereto through banana plug 280. At its other end 285, cable 276 is also stripped to expose the shield 282. Again, the center conductor of cable 276 is connected electrically to a banana plug 287. The shield 282 is terminated at 283. A sleeve 286 of, for example, heat-shrinkable semi-rigid, multiple wall polyolefin, is slipped onto the stripped end of cable 276 over the exposed shield 282 and the end 288 of the cable jacket 290. Then, a length 294 of heat-shrinkable tetrafluoroethylene (TFE) is slipped over the sleeve 286 and the adjacent region of cable jacket 290, shrunk, and trimmed flush with the end 291 of polyolefin sleeve 286. End 285 is inserted into passageway 260 through an electrically non-conductive, for example, resin, compression spring strain relief 289 (FIGS. 10 and 13) until plug 287 is firmly in electrical contact with connector 264.

Figure 16:
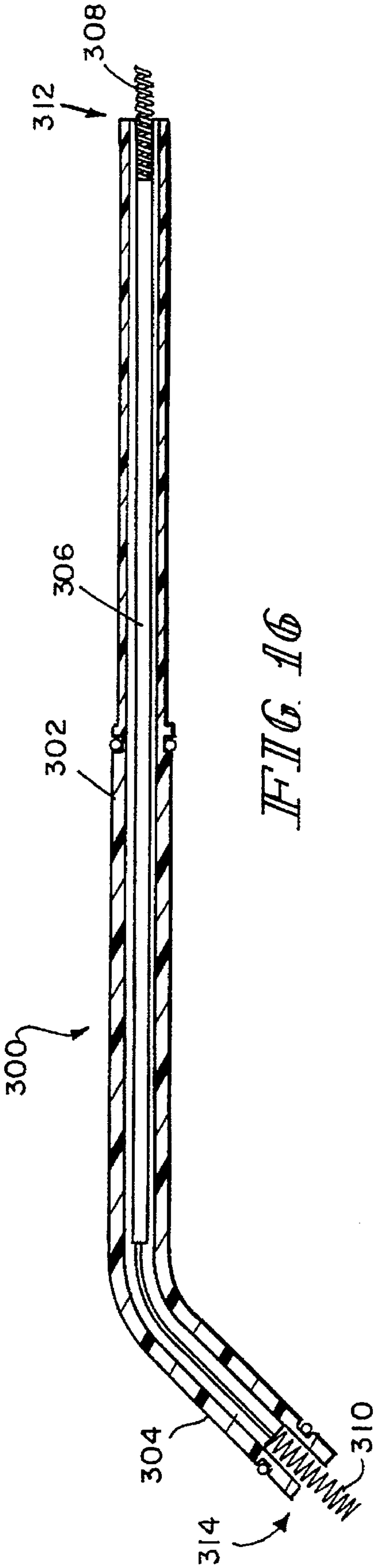
FIG. 16 illustrates a longitudinal sectional view of a detail of the system illustrated in FIG. 10.
Figure 18:
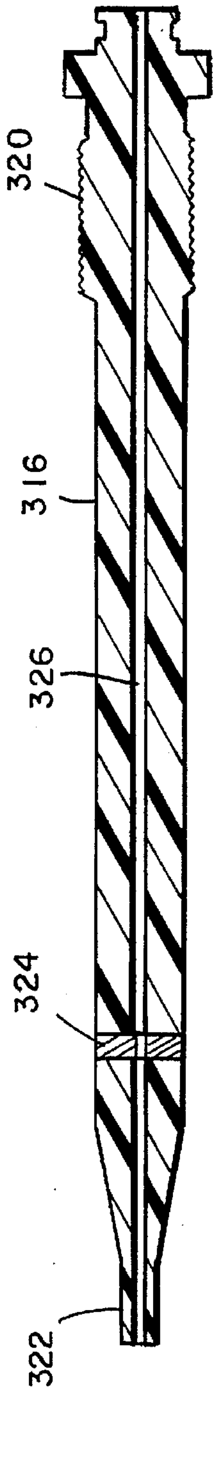
Figure 17:
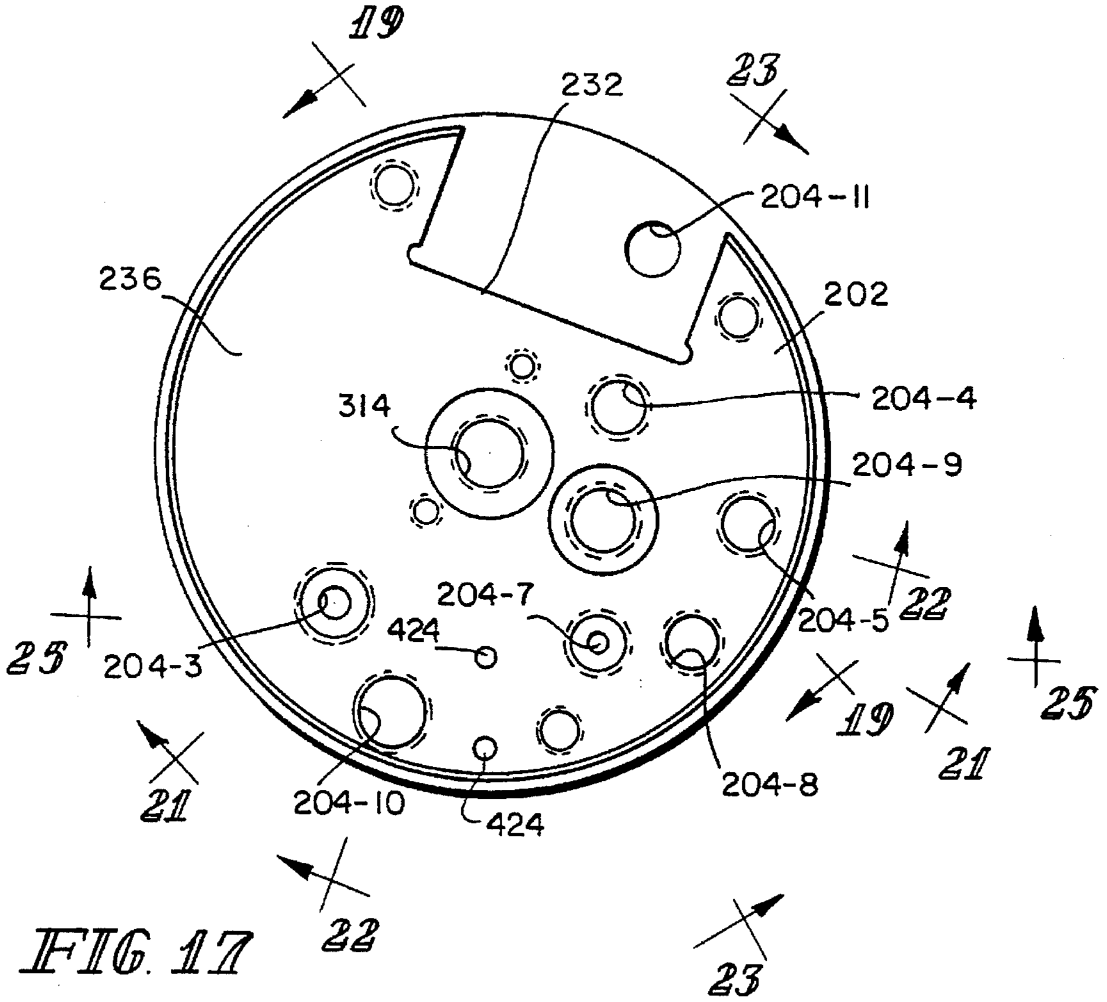
FIG. 17 illustrates a rear elevational view of a detail of the system illustrated in FIG. 10.
Figure 19:
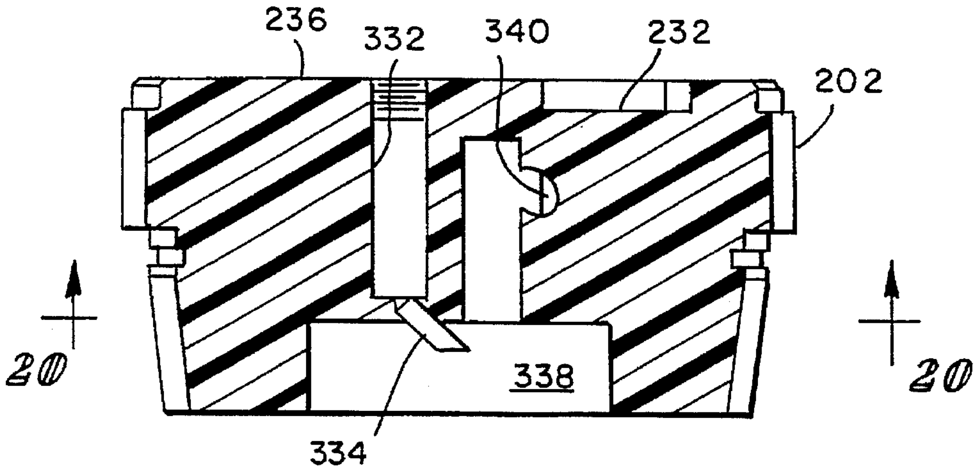
FIG. 19 illustrates a longitudinal sectional view of the detail of FIG. 17, taken generally along section lines 19—19 thereof.
Figure 20:
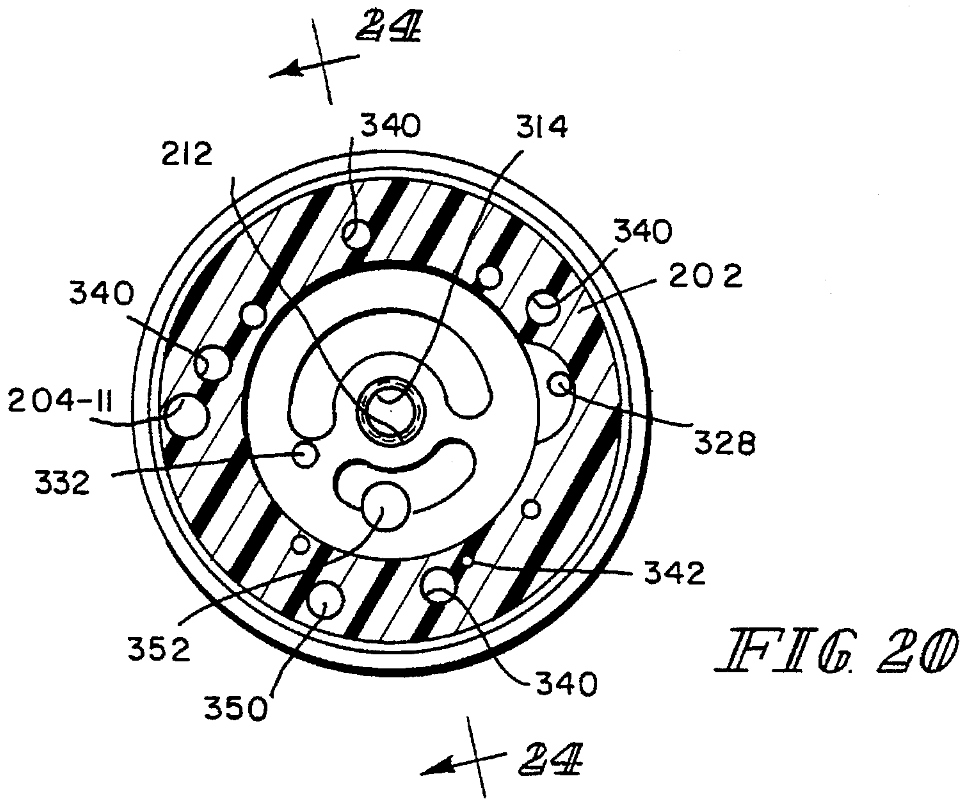
FIG. 20 illustrates a transverse sectional view of the detail of FIG. 17, taken generally along section lines 20–22 of FIG. 19.
Figure 21:
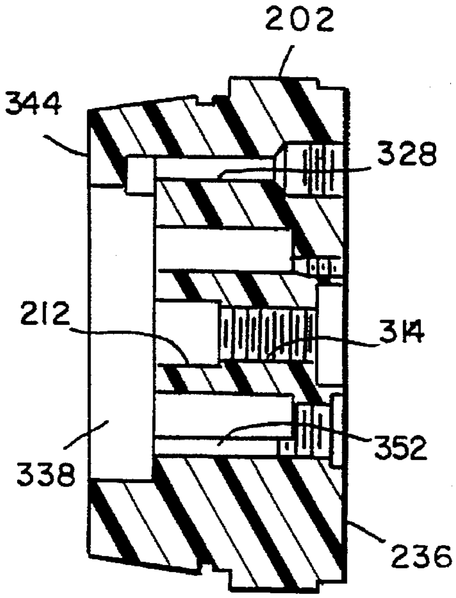
FIG. 21 illustrates a longitudinal sectional view of the detail of FIG. 17, taken generally along section lines 21—21 thereof.
Figure 22:
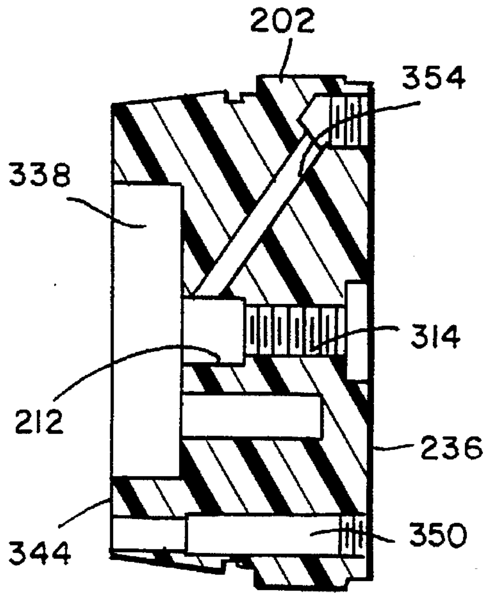
FIG. 22 illustrates a longitudinal sectional view of the detail of FIG. 17, taken generally along section lines 22—22 thereof.
Figure 23:
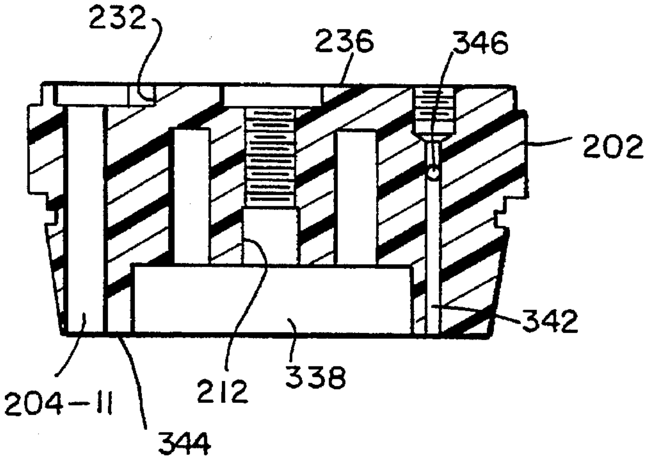
FIG. 23;illustrates a longitudinal sectional view of the detail of FIG. 17, taken generally along section lines 23—23 thereof.
Figure 24:
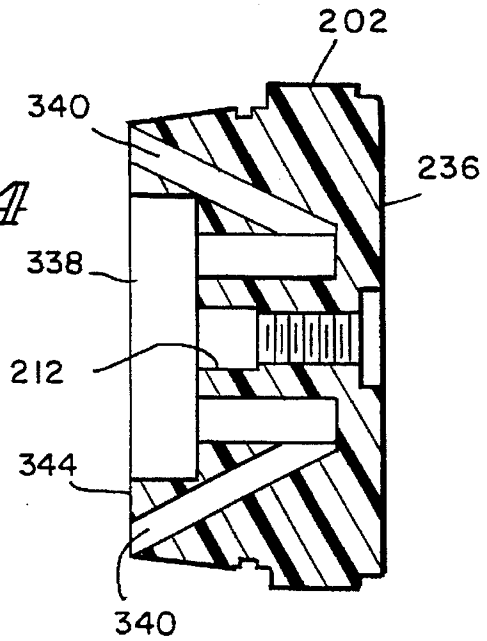
FIG. 24 illustrates a longitudinal sectional view of the detail of FIG. 17, taken generally along section lines 24—24 of FIG. 20.
Figure 25:
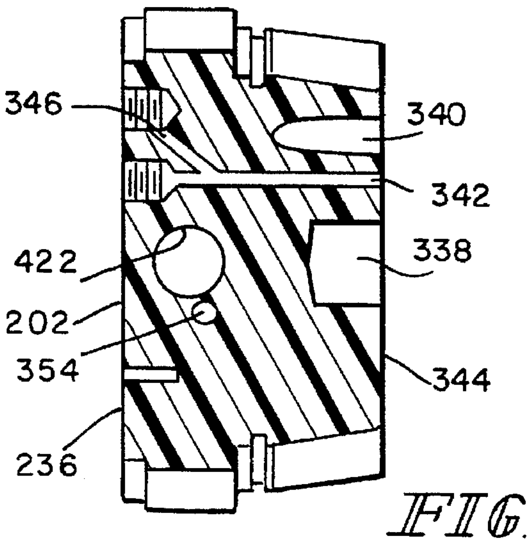
FIG. 25 illustrates a longitudinal sectional view of the detail of FIG. 17, taken generally along section lines 25—25 of FIG. 17.
Figure 26:
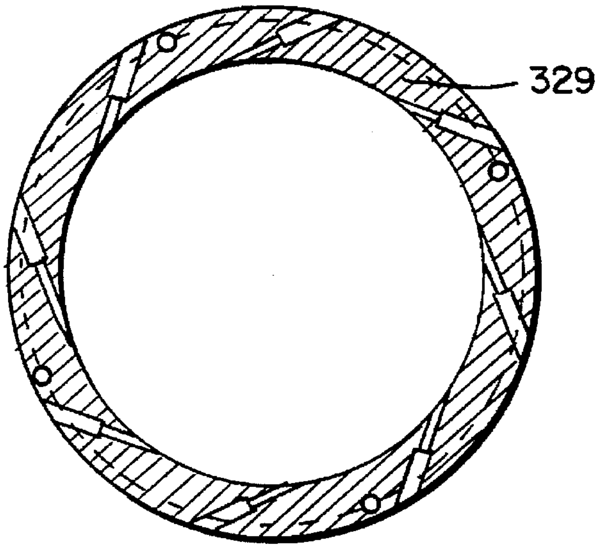
FIG. 26 illustrates a transverse sectional view through a detail of the system illustrated in FIG. 10, taken generally along section lines 26—26 thereof.
Figure 29:
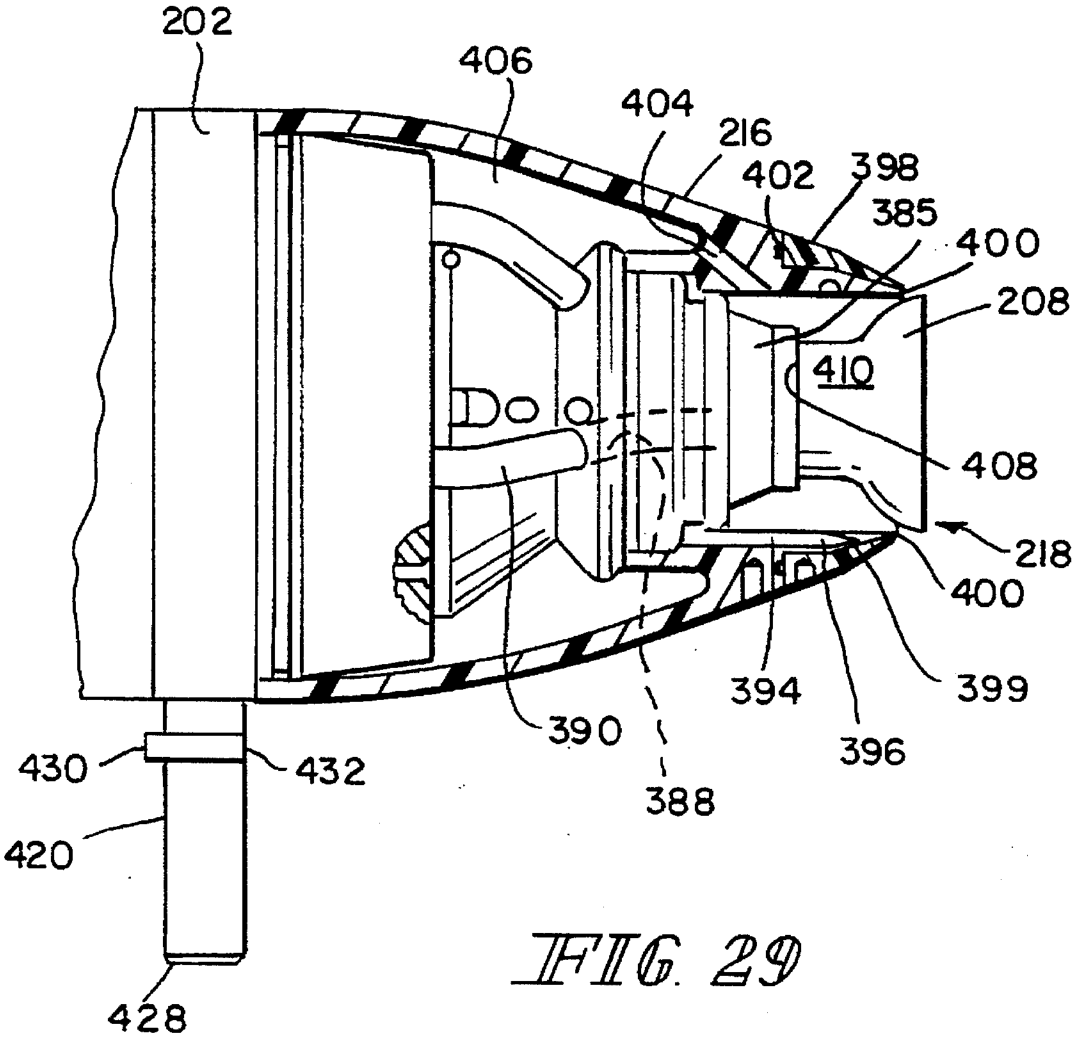
FIG. 29 illustrates a fragmentary, partly broken away, partial longitudinal sectional view of the system illustrated in FIG. 10.

Referring to FIGS. 10 and 16, the electrical connection is made from connector 266 to the bearing 207 and thence to the shaft 214 and atomizer 208 through a resistor tube assembly 300 which extends through passageway 204-11 in manifold 202. Assembly 300 comprises a, for example, high density polyethylene, tube 302. A region 304 adjacent one end of tube 302 is formed at about a 45° (135°) angle to the remainder of tube 302. Tube 302 houses a 100MΩ resistor 306. A coiled, electrically conductive, for example, stainless steel, compression spring 308 is slipped over one end of resistor 306 at end 312 of tube 302. A lead at the other end of resistor 306 is soldered to a compression spring 310 at the other end 314 of tube 302. A potting compound is then poured into ends 312, 314 and permitted to harden, completing the assembly 300. End 312 is inserted into passageway 262 to bring spring 308 firmly into electrical contact with connector 266. Contact between spring 310 and bearing 207 is achieved in a manner which will be described.

Returning to the manifold 202, and referring to FIGS. 17–26, paint or solvent from the trigger/dump/solvent manifold 205 is supplied through a central passageway 314 in manifold 202 to a feed tube 316 which is provided at one end with an 0-ring 318 sealing the feed tube into the manifold 205 and is threaded 320 intermediate its ends into manifold 202. Feed tube 316 is constructed from an electrically non-conductive material such as, for example, Delrin® acetal resin. However, toward its distal end 322, an electrically conductive, for example, stainless steel, pin 324 is press fitted into a passageway which extends transversely across the longitudinal extent of feed tube 316. A paint/solvent feed passageway 326 is formed through tube 316 and pin 324 from end to end of tube 316. The coating material passing through passageway 326 on its way to atomizer 208 picks up electrical charge as it passes through pin 324 owing to the close spacing of the ends of pin 324 to shaft 214. The charge thus transferred to the coating material aids in preventing its deposition on the outside surfaces of assembly 200 after the coating material is dispensed from atomizer 208.

Turbine 206 drive air is supplied from fitting 204-3 through a passageway 328 provided in manifold 202 and a turbine feed plate 329 to the turbine blades or buckets provided around the periphery of the turbine's wheel 330 to spin it. Turbine 206 braking air is selectively supplied from fitting 204-4 through a braking air passageway 332 and brake air feed tube or nozzle 334 to braking air blades or buckets provided in the back surface 336 of turbine wheel 330 to retard its rotation frequency. Exhaust air, both from driving and braking the turbine wheel 330 is exhausted from the turbine chamber 338 through exhaust passageways 340 which are directed forward in manifold 202, toward atomizer 208, in a labyrinth-type configuration to increase the electrical isolation of the turbine 206 from the exterior of the assembly 200.

Turbine bearing air supplied through fitting 204-7 flows through a bearing air passageway 342 to the front 344 of manifold 202. An intersecting passageway 346 couples bearing air to fitting 204-8, from which it can be coupled to the turbine drive air and paint/solvent shutoff controls previously discussed.

Atomized coating material cloud shaping air from fitting 204-5 is provided through a shaping air passageway 350 to the front 344 of manifold 202. Turbine 206 speed monitor 210 is mounted in an opening 352 to face the back surface 336 of turbine wheel 330. Opening 352 communicates with fitting 204-9. The weep port 204-10 is coupled through passageway 354 to gallery 212.

Figure 27:
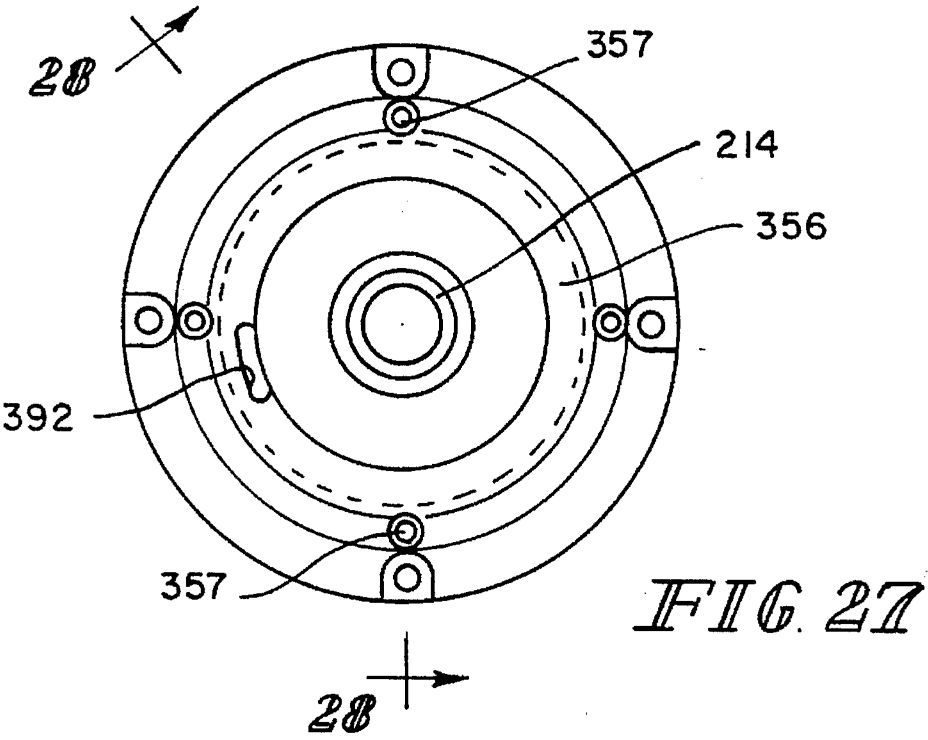
FIG. 27 illustrates a front elevational view of a detail of the system illustrated in FIG. 10.
Figure 28:
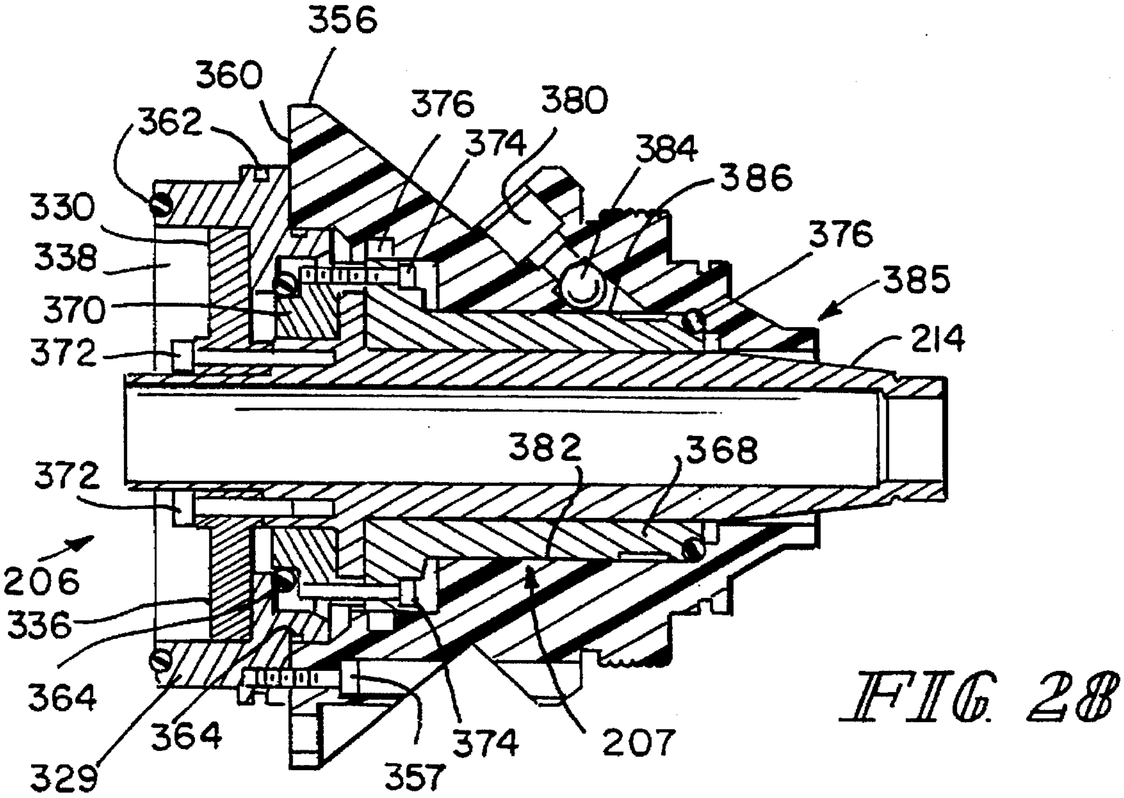
FIG. 28 illustrates a longitudinal sectional view of the detail of FIG. 27, taken generally along section lines 28—28 thereof.

Referring to FIGS. 27–28, the turbine 206 housing 356 is attached to the front 344 of manifold 202 using electrically conductive, for example, metal, fasteners, and capturing the turbine feed plate 329 therebetween. Turbine feed plate 329 is attached to housing 356 by electrically conductive, for example, metal, threaded fasteners 357. The turbine feed plate 329 and housing 356 illustratively are constructed from Delrin® acetal resin. The turbine feed plate 329 is sealed to the front 344 of manifold 202 and the back 360 of turbine housing 356 with O-ring seals 362, 364, respectively. A bearing air passageway 366 (FIG. 10) communicates with passageway 342, and a suitable O-ring face seal is provided around the adjacent ends of these passageways to seal them. Bearing air from passageway 366 flows through the front 368 and rear 370 bearing 207 components and along the surface of shaft 214 which is captured between the front and rear bearing components 368, 370. The shaft 214 is thus suspended within bearing 207 on a microthin film of air. Turbine wheel 330 is attached to the rear end of shaft 214, and the front and rear bearing components 368, 370 are connected together by suitable electrically conductive, for example, metal, threaded fasteners 372, 374, respectively. Leakage of bearing air past front bearing component 368 and along the interior of housing 356 is minimized by O-ring seals 376. A passageway 380, the axis of which is angled at about 45° to the shaft 214 axis intersects the central passageway 382 of the housing 356 near the front end of front bearing component 368. Passageway 380 has a reduced diameter section to capture an electrically conductive, for example, stainless steel, sphere 384 against the outside surface 386 of bearing component 368. Sphere 384 is urged against surface 386 by spring 310 (FIG. 10) when end 314 of tube 302 is inserted into the outer end of passageway 380.

A shaping air passageway 388 (FIG. 29) is connected by a length of non-conductive, for example, PTFE, tubing 390 to passageway 350 to conduct shaping air forward to an arcuate slot shaped opening 392 (FIG. 27) on the front of turbine housing 356. Opening 392 communicates through a passageway 394 (FIGS. 10 and 29) provided within front housing 216 with a gallery 396 defined between front housing 216 and a shaping air ring 398 which threads onto the front of front housing 216. Front housing 216 is provided with a plurality, illustratively ninety, of equally circumferentially spaced, radially inwardly and axially extending grooves in a somewaht frustoconical nose 399 to maintain a uniform width slot 400 between the front edges of front housing 216 and shaping air ring 398. Shaping air passes through the grooves and out around the recessed distal end 218 and atomizer 208. An O-ring 402 seals the back surface of shaping air ring 398 against the facing surface of front housing 216.

Passageways 404 are provided between the interior 406 of front housing 216 and the recessed distal end 218 thereof. Air exhausted forward through passageways 340, interior 406 and passageways 404 is exhausted forward into recessed distal end 218 and out around atomizer 208, to aid in keeping the outer surfaces of atomizer 208 clean and assisting the shaping air flowing from slot 400 to shape the atomized coating material cloud.

Because the greatest non-incendive benefit of the atomizer 200 is only achieved when all of the above-discussed components of it are used in combination, and because atomizers are available which otherwise might be capable of being mounted on shaft 214, housing 356 is extended in region 385 to reduce the likelihood that such other atomizers, other than atomizer 208, will be fitted to the end of shaft 214.

The atomizer 208 itself is of similar configuration to the atomizer of FIGS. 8*a–d*. The atomizer is fabricated from electrically non-conductive materials, for example PEEK with a Delrin® acetal splash plate attached to it by countersunk nylon screws. The back outside surface 408 of the atomizer 208 is first coated with an electrical erosion-resisting, electrically conductive coating prepared from about 6.5 parts by weight short oil alkyds in xylene and ethyl benzene, such as Reichhold Chemicals, Inc., Beckosol® 12-038, about 15.1 parts by weight phenolic in n-butyl alcohol, such as Georgia Pacific Bakelite BKS-7590, and about 18 parts by weight antimony-tin oxide powder, such as DuPont Zelec ECP-3005-XC, all in about 20.3 parts by weight n-butyl alcohol. In this particular short oil alkyd composition, the short oil alkyds form about 55% of the total weight, with about 35% of the total weight being attributable to the xylene and about 10% of the total weight to the ethyl benzene. In this particular phenolic composition, about 55% of the total weight is attributable to the phenolic with the remaining weight being attributable to n-butyl alcohol (about 75%), phenol (about 15%), and cresols (less than about 10%). The constituents of this first coating are mixed together and then milled in a ball mill for about two hours.

This first coating is then applied so that on the finished atomizer 208, the first coating is about one-half mil (about 0.013 mm) thick on surface 408. The first coating is then cured substantially to remove the fluid carrier, leaving a first non-insulative film on the surface 408.

Next, a second, semiconductive coating is applied to the external surfaces 408, 410 of atomizer 208. This second coating is prepared from about 19.2 parts by weight of, for example, Beckosol® 12-038 short-oil alkyds composition, about 44.5 parts by weight, for example, Bakelite BKS-7590 phenolic composition and about 39.8 parts by weight, for example, Zelec ECP-3005-XC, all in about 28.1 parts by weight n-butyl alcohol. The constituents of this second coating are mixed together and then milled in a ball mill for about twenty hours. This second coating is then applied so that, on the finished atomizer 208, the second coating is about one mil (about 0.025 mm) thick on surface 410. The second coating is then cured substantially to remove the fluid carrier, leaving a second non-insulative film on at least part of the first non-insulative film.

Finally, a third, top coating is applied to surfaces 408, 410 of atomizer 208. This third coating is prepared from about 38.2 parts by weight, for example, Beckosol® 12-038 short oil alkyds, and about 88.3 parts by weight, for example, Bakelite BKS-7590, all in about 48.5 parts by weight n-butyl alcohol. This third coating is applied so that, after curing for about an hour at about 177° C., the third coating is about one mil (about 0.025 mm) thick on surfaces 408, 410. The third coating is then cured substantially to remove the fluid carrier, leaving a third non-conductive film on at least part of the second film. The first coating reduces the likelihood of electrical erosion of the material from which atomizer 208 is fabricated in the region 408 where electrical charge is transferred between shaft 214 and atomizer 208. The movement of the charge, once it is on atomizer 208, is controlled by the resistance of the second coating. The third coating is applied primarily to protect the second coating. In the coating formulations, the short oil alkyd compositions and phenolic compositions typically are in specific carriers when purchased, and, as a consequence, not much can be done about, for example, the existence of xylene and ethyl benzene or whatever other carrier(s) is(are) employed for the short oil alkyds, or the existence of n-butyl alcohol or whatever other carrier(s) is(are) employed for the phenolic. However, in the carrier(s) which is (are) added to arrive at the final formulations, other suitable carriers besides butyl alcohol have been employed successfully. For example, butyl acetate xylene, methyl ethyl ketone (MEK), propyl alcohol, butyl cellosolve and mixtures of any of these can function as appropriate added carriers. Some care needs to be observed in that some of these, notably n-butyl alcohol, have what may be characterized as negative film thickness coefficients of resistance. That is, for thinner cured films, the resistance of the film decreases. For others of these added carriers, the film thickness coefficients of resistance can conversely be characterized as positive.

An electrically non-conductive, for example, glass-filled nylon, mounting stud 420 (FIGS. 10, 11 and 29) is inserted into a hole 422 (FIG. 25) provided therefor in manifold 202. Stud 420 is attached to manifold 202 by electrically non-conductive, for example, polyester fiberglass, pins pressed into openings 424 provided in manifold 202 and stud 420. Stud 420 is generally right circular cylindrical in configuration, but has a radially outwardly projecting stop 428 provided at its distal end and a radially outwardly projecting stop 430 provided intermediate its proximal and distal ends. Stop 430 is provided with a chordal flat 432.

Figure 32:
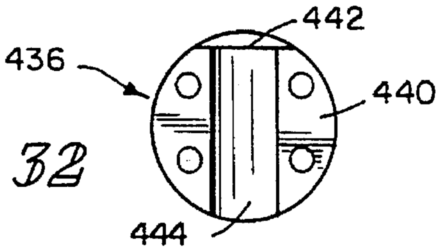
FIG. 32 illustrates an end elevational view of the support of FIGS. 30–31, taken generally along section lines 32—32 of FIG. 31.
Figure 30:
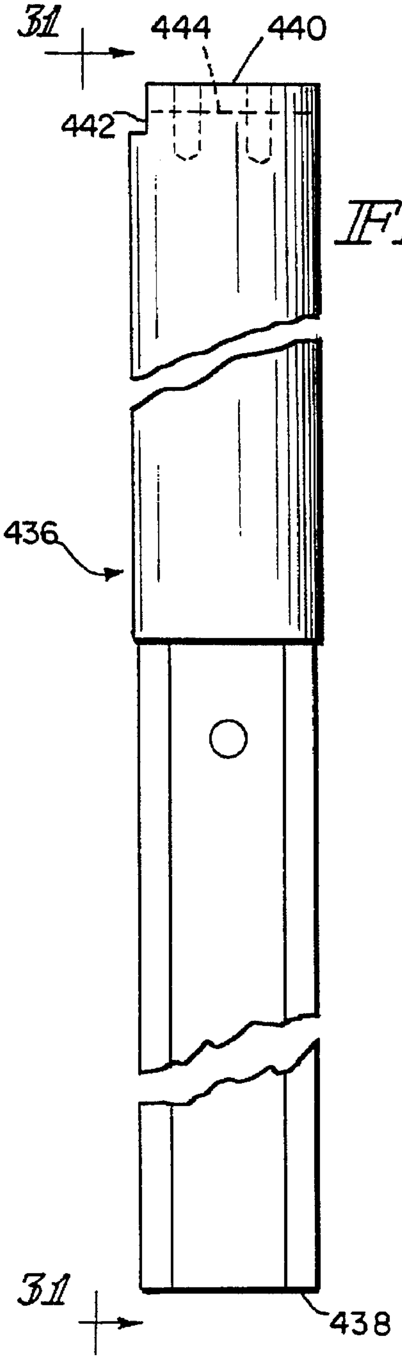
FIG. 30 illustrates a fragmentary side elevational view of a support for mounting an assembly constructed according to the present invention.
Figure 31:
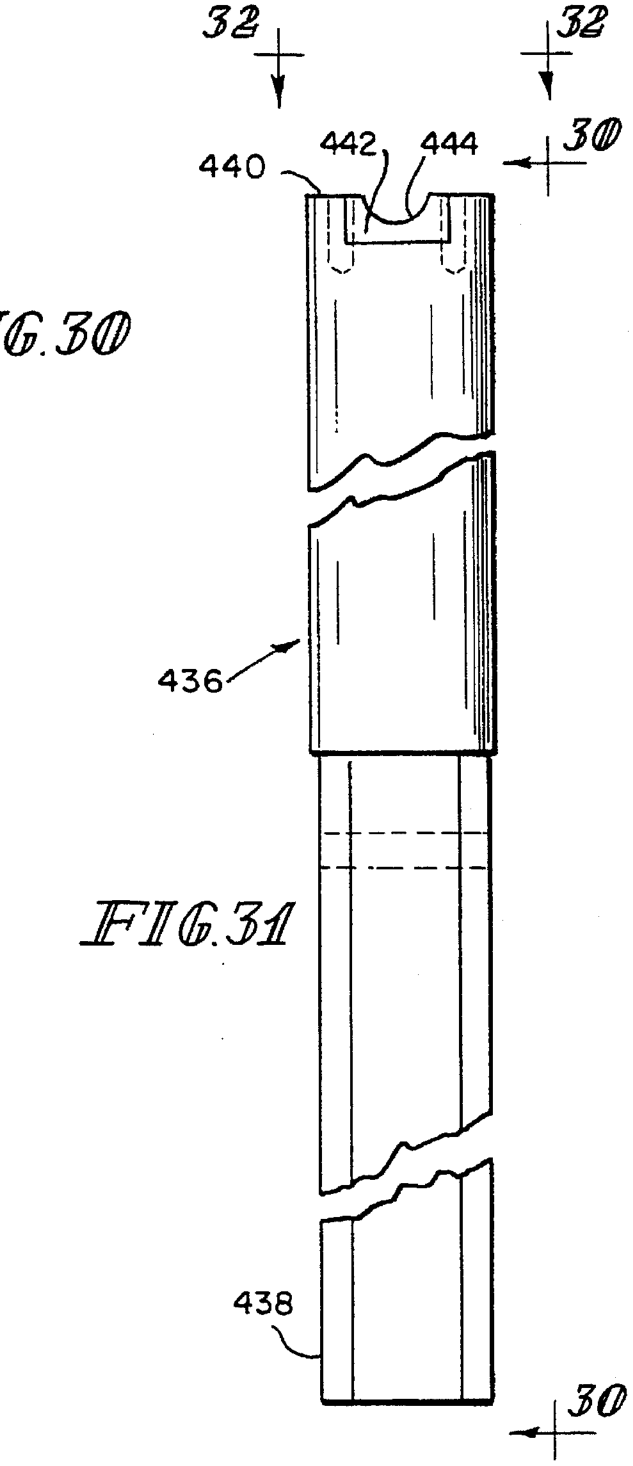
FIG. 31 illustrates a fragmentary top plan view of the support of FIG. 30, taken generally along section lines 31—31 thereof.

Referring to FIGS. 30–32, an insulative support 436 constructed from, for example, nylon, has an, for example, aluminum end 438 adapted for insertion into a support structure, not shown, of known configuration. Support 436 is generally right circular cylindrical in configuration. A chordal flat 442 is provided in the sidewall of support 436 adjacent an end 440 thereof. End 440 of support 436 is provided with a semicircular cross section, diametrically extending groove 444 which extends from flat 442. The diameter of groove 444 is about the same as the diameter of stud 420.

Referring now to FIGS. 33–35, an electrically non-conductive, for example, nylon, clamp plate 448 is generally right circular cylindrical disk-shaped in configuration. One face 450 thereof is provided with a diametrically extending generally rectangular prism shaped rib 452. The other face 454 thereof is provided with a semicircular cross section groove 456 which extends along the same diameter as rib 452. The diameter of groove 456 is about the same as the diameter of stud 420.

Groove 456 is provided with chordal flats 458, 460 at its opposite ends. Flat 458 extends the full thickness of clamp plate 448. Flat 460 extends from face 454 to the depth of groove 456, leaving a stop 462 between that depth and face 450. Matching rectangular threaded bolt hole patterns in end 440 and clamp plate 448 permit the clamp plate 448 to be mounted to end 440 with stop 462 in interfering orientation with stop 430, preventing positioning of assembly 200 in other than a parallel orientation with the longitudinal extent of support 436. This bolt hole configuration also permits the clamp plate 448 to be rotated 180° so that flat 458 is adjacent flat 442. This orientation of the clamp plate 448 relative to end 440 of support 436 permits positioning of assembly 200 in orientations other than with its longitudinal extent parallel to the longitudinal extent of support 436.

What is claimed is:

1. In combination: an electrically non-conductive rotary atomizer having a surface which is to be rendered electrically non-insulative; and a coating for rendering the surface electrically non-insulative, the coating comprising short oil alkyds, phenolic and a powdered mixture of oxides of antimony and tin, the coating comprising, by combined weight of the short oil alkyds, phenolic and powdered mixture of oxides of antimony and tin, about one-seventh to about one-tenth short oil alkyds, about one-third to about one-fourth phenolic, and about one-half to about two-thirds powdered mixture of oxides of antimony and tin, after the evaporation of solvent.

2. In combination: an electrically non-conductive rotary atomizer having a surface which is to be protected; and a coating for protecting the surface, the coating comprising short oil alkyds and phenolic, the coating comprising, by combined weight of the short oil alkyds and phenolic, about one-third short oil alkyds, and about two-thirds phenolic, after the evaporation of solvent.

3. In combination: an electrically non-conductive rotary atomizer having a surface which is to be rendered electrically non-insulative; and a coating for rendering the surface electrically non-insulative, the coating comprising short oil alkyds, phenolic and a powdered mixture of oxides of antimony and tin, the coating comprising, by combined weight of the short oil alkyds, phenolic and powdered mixture of oxides of antimony and tin, about one-eighth short oil alkyds, about one-fourth phenolic, and about five-eighths powdered mixture of oxides of antimony and tin, after the evaporation of solvent.

4. In combination: an electrically non-conductive rotary atomizer having a surface which is to be rendered electrically non-insulative; and a coating for rendering the surface electrically non-insulative, the coating comprising, by combined weight of the short oil alkyds, phenolic and powdered mixture of oxides of antimony and tin, about one-seventh short oil alkyds, about one-third phenolic, and about one-half powdered mixture of oxides of antimony and tin, after the evaporation of solvent.

5. In combination: an electrically non-conductive rotary atomizer having a surface which is to be rendered electrically non-insulative; and a coating for rendering the surface electrically non-insulative, the coating comprising short oil alkyds, phenolic, a powdered mixture of oxides of antimony and tin, and a fluid carrier comprising a solvent selected from the group consisting of butyl alcohol, butyl acetate, xylene, ethyl benzene, MEK, propyl alcohol, butyl cellosolve and mixtures of these, the coating composition comprising, by combined weight of the short oil alkyds, phenolic, powdered mixture of oxides of antimony and tin, and fluid carrier, about one-sixteenth to about one-twelfth short oil alkyds, about one-seventh to about one-fifth phenolic, about one-third powdered mixture of oxides of antimony and tin, and about one-half to about two-fifths fluid carrier.

6. In combination: an electrically non-conductive rotary atomizer having a surface which is to be protected; and a coating for protecting the surface, the coating comprising short oil alkyds, phenolic and a fluid carrier comprising a solvent selected from the group consisting of butyl alcohol, butyl acetate, xylene, ethyl benzene, MEK, propyl alcohol, butyl cellosolve and mixtures of these, the coating comprising, by combined weight of the short oil alkyds, phenolic, and fluid carrier, about one-eighth short oil alkyds, about two-sevenths phenolic, and about three-fifths fluid carrier.

7. In combination: an electrically non-conductive rotary atomizer having a surface which is to be rendered electrically non-insulative; and a coating for rendering the surface electrically non-insulative, the coating comprising short oil alkyds, phenolic, a powdered mixture of oxides of antimony and tin, and a fluid carrier comprising a solvent selected from the group consisting of butyl alcohol, butyl acetate, xylene, ethyl benzene, MEK, propyl alcohol, butyl cellosolve and mixtures of these, the coating comprising, by combined weight of the short oil alkyds, phenolic, powdered mixture of oxides of antimony and tin and fluid carrier, about one-sixteenth short oil alkyds, about one-seventh phenolic, about one-third powdered mixture of oxides of antimony and tin, and about one-half fluid carrier.

8. In combination: an electrically non-conductive rotary atomizer having a surface which is to be rendered electrically non-insulative; and a coating for rendering the surface electrically non-insulative, the coating comprising short oil alkyds, phenolic, a powdered mixture of oxides of antimony and tin, and a fluid carrier comprising a solvent selected from the group consisting of butyl alcohol, butyl acetate, xylene, ethyl benzene, MEK, propyl alcohol, butyl cellosolve and mixtures of these, the coating comprising, by combined weight of the short oil alkyds, phenolic, powdered mixture of oxides of antimony and tin and fluid carrier, about one-twelfth short oil alkyds, about one-fifth phenolic, about one-third powdered mixture of oxides of antimony and tin, and about two-fifths fluid carrier.

* * * * *